(12) United States Patent
Thomson et al.

(10) Patent No.: US 9,950,284 B2
(45) Date of Patent: *Apr. 24, 2018

(54) FILTER MEDIA SUITABLE FOR HYDRAULIC APPLICATIONS

(71) Applicant: Hollingsworth & Vose Company, East Walpole, MA (US)

(72) Inventors: Cameron Thomson, Charleston, SC (US); Milind Godsay, Nashua, NH (US); Randall Keisler, Clifton Park, NY (US)

(73) Assignee: Hollingsworth & Vose Company, East Walpole, MA (US)

( * ) Notice: Subject to any disclaimer, the term of this patent is extended or adjusted under 35 U.S.C. 154(b) by 506 days.

This patent is subject to a terminal disclaimer.

(21) Appl. No.: 14/584,155

(22) Filed: Dec. 29, 2014

(65) Prior Publication Data

US 2015/0182885 A1    Jul. 2, 2015

Related U.S. Application Data

(63) Continuation of application No. 12/899,512, filed on Oct. 6, 2010, now Pat. No. 8,950,587, which is a
(Continued)

(51) Int. Cl.
*B01D 29/56* (2006.01)
*B01D 39/16* (2006.01)
(Continued)

(52) U.S. Cl.
CPC ......... *B01D 29/56* (2013.01); *B01D 29/0093* (2013.01); *B01D 39/06* (2013.01);
(Continued)

(58) Field of Classification Search
CPC ................ B01D 29/01; B01D 39/1623; B01D 39/2003; B01D 39/2017; B01D 39/2014;
(Continued)

(56) References Cited

U.S. PATENT DOCUMENTS 3,353,682 A    11/1967 Pall et al.
3,849,241 A    11/1974 Butin et al.
(Continued)

FOREIGN PATENT DOCUMENTS

CN    1970131 A    5/2007
CN    101098741 A    1/2008
(Continued)

OTHER PUBLICATIONS

Technical Data Sheet by I.W. Tremont Co., Inc.; "Filtration & Technical Speciality Papers", Hawthorne, New Jersey, date and author unavailable.*
(Continued)

*Primary Examiner* — Joseph Drodge
(74) *Attorney, Agent, or Firm* — Wolf, Greenfield & Sacks, P.C.

(57) ABSTRACT

Filter media, including those suitable for hydraulic applications, and related components, systems, and methods associated therewith are provided. The filter media described herein may include two or more layers, at least one of the layers having a relatively high percentage of microglass fibers. Additionally, the filter media may be designed such that the ratio of average fiber diameters between two layers is relatively small, which can lead to a relatively low resistance ratio between the layers. In some embodiments, at least one layer of the filter media comprises synthetic polymer fibers. Certain filter media described herein may have desirable properties including high dirt holding capacity and a low resistance to fluid flow. The media may be incorporated into a variety of filter element products including hydraulic filters.

28 Claims, 4 Drawing Sheets

Related U.S. Application Data continuation-in-part of application No. 12/418,375, filed on Apr. 3, 2009, now Pat. No. 8,951,420.

(51) Int. Cl.
*B01D 39/20* (2006.01)
*G06K 9/00* (2006.01)
*B01D 29/00* (2006.01)
*B01D 39/06* (2006.01)

(52) U.S. Cl.
CPC ..... *B01D 39/1623* (2013.01); *B01D 39/2017* (2013.01); *G06K 9/00335* (2013.01); *B01D 2201/188* (2013.01); *B01D 2239/064* (2013.01); *B01D 2239/065* (2013.01); *B01D 2239/1233* (2013.01); *Y10T 428/249964* (2015.04); *Y10T 428/249969* (2015.04)

(58) Field of Classification Search
CPC ........ B01D 2239/065; B01D 2239/069; B01D 2239/1225; B01D 39/06; B01D 29/0093; B01D 2239/064; B01D 2239/1233; B01D 2201/188; B01D 29/0047; B01D 29/0052; B01D 29/0059; B01D 29/56; B01D 33/35; B01D 33/41; B01D 39/16; B01D 39/1607; B01D 39/1684; B01D 2239/0613; B01D 2239/0618; B01D 2239/0622; B01D 2239/0627; B01D 2239/0631; B01D 2239/0636; B01D 2239/0654; B01D 2239/0668; B01D 2239/12; B01D 2239/1216; B01D 2275/10; B01D 2275/105; B01D 2275/30; B32B 5/22; B32B 5/26; B32B 5/32; B32B 17/00; B32B 17/02; B32B 17/06; B32B 17/064; B32B 17/10; B32B 27/06; B32B 27/12; G06K 9/00335; Y10T 428/249964; Y10T 428/249969
USPC ................... 55/482, 485–489; 210/488–490, 210/503–508, 335, 500.26, 321.75, 210/321.84, 500.27, 500.36, 500.38; 428/112, 156, 172, 304.4, 307.3, 308.4, 428/309.9, 311.11, 311.51, 312.2, 312.6, 428/339, 340, 426, 428, 210; 96/7–9, 11, 96/12

See application file for complete search history.

(56) References Cited

U.S. PATENT DOCUMENTS

| | | |
|---|---|---|
| 4,018,646 A | 4/1977 | Ruffo et al. |
| 4,033,881 A | 7/1977 | Pall |
| 4,102,785 A | 7/1978 | Head et al. |
| 4,188,197 A | 2/1980 | Amberkar et al. |
| 4,455,195 A | 6/1984 | Kinsley |
| 4,622,259 A | 11/1986 | McAmish et al. |
| 4,892,667 A | 1/1990 | Parker, III et al. |
| 4,925,601 A | 5/1990 | Vogt et al. |
| 5,108,827 A | 4/1992 | Gessner |
| 5,135,719 A | 8/1992 | Hillman et al. |
| 5,149,576 A | 9/1992 | Potts et al. |
| 5,178,931 A | 1/1993 | Perkins et al. |
| 5,238,474 A | 8/1993 | Kahlbaugh et al. |
| 5,240,479 A | 8/1993 | Bachinski |
| 5,288,402 A | 2/1994 | Yoshida |
| 5,290,446 A | 3/1994 | Degen et al. |
| 5,306,321 A | 4/1994 | Osendorf |
| 5,342,424 A | 8/1994 | Pfeffer |
| 5,401,446 A | 3/1995 | Tsai et al. |
| 5,496,227 A | 3/1996 | Bagrodia et al. |
| 5,496,507 A | 3/1996 | Angadjivand et al. |
| 5,580,459 A | 12/1996 | Powers et al. |
| 5,582,907 A | 12/1996 | Pall |
| 5,591,335 A | 1/1997 | Barboza et al. |
| 5,620,785 A | 4/1997 | Watt et al. |
| 5,639,370 A | 6/1997 | Fall et al. |
| 5,647,881 A | 7/1997 | Zhang et al. |
| 5,672,188 A * | 9/1997 | Choi .................. B01D 39/083 55/485 |
| 5,672,399 A | 9/1997 | Kahlbaugh et al. |
| 5,702,616 A | 12/1997 | Degen et al. |
| 5,783,503 A | 7/1998 | Gillespie et al. |
| 5,785,725 A | 7/1998 | Cusick et al. |
| 5,786,065 A | 7/1998 | Annis et al. |
| 5,804,512 A | 9/1998 | Lickfield et al. |
| 5,935,883 A | 8/1999 | Pike |
| 5,955,174 A | 9/1999 | Wadsworth et al. |
| 5,993,501 A | 11/1999 | Cusick et al. |
| 6,007,608 A | 12/1999 | Johnson |
| 6,034,008 A | 3/2000 | Lim et al. |
| 6,099,726 A | 8/2000 | Gembolis et al. |
| 6,099,729 A | 8/2000 | Cella et al. |
| 6,113,784 A | 9/2000 | Stoyell et al. |
| 6,123,752 A | 9/2000 | Wu et al. |
| 6,171,369 B1 | 1/2001 | Schultink et al. |
| 6,171,684 B1 | 1/2001 | Kahlbaugh et al. |
| 6,183,536 B1 | 2/2001 | Schultink et al. |
| 6,193,773 B1 | 2/2001 | Schlor et al. |
| 6,261,979 B1 | 7/2001 | Tanaka et al. |
| 6,267,252 B1 | 7/2001 | Amsler |
| 6,315,806 B1 | 11/2001 | Torobin et al. |
| 6,372,004 B1 | 4/2002 | Schultink et al. |
| 6,422,396 B1 | 7/2002 | Li et al. |
| 6,428,610 B1 | 8/2002 | Tsai et al. |
| 6,476,135 B1 | 11/2002 | Bugada et al. |
| 6,517,612 B1 | 2/2003 | Crouch et al. |
| 6,554,881 B1 | 4/2003 | Healey |
| 6,576,323 B2 | 6/2003 | Wise et al. |
| 6,579,350 B2 | 6/2003 | Doherty |
| 6,603,054 B2 | 8/2003 | Chen et al. |
| H2086 H | 10/2003 | Amsler |
| 6,743,273 B2 | 6/2004 | Chung et al. |
| 6,746,517 B2 | 6/2004 | Benson et al. |
| 6,759,356 B1 | 7/2004 | Myers |
| 6,858,057 B2 | 2/2005 | Healey |
| 6,872,311 B2 | 3/2005 | Koslow |
| 6,872,431 B2 | 3/2005 | Kahlbaugh et al. |
| 6,924,028 B2 | 8/2005 | Chung et al. |
| 6,936,554 B1 | 8/2005 | Singer et al. |
| 6,955,775 B2 | 10/2005 | Chung et al. |
| 6,986,804 B2 | 1/2006 | Dominiak et al. |
| 7,008,465 B2 | 3/2006 | Graham et al. |
| 7,070,640 B2 | 7/2006 | Chung et al. |
| 7,097,694 B1 | 8/2006 | Jaroszczyk et al. |
| 7,137,510 B1 | 11/2006 | Klein et al. |
| 7,144,533 B2 | 12/2006 | Koslow |
| 7,163,625 B1 | 1/2007 | Williamson et al. |
| 7,179,317 B2 | 2/2007 | Chung et al. |
| 7,235,122 B2 | 6/2007 | Bryner et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,319,122 B2 | 1/2008 | Cheng et al. |
| 7,390,760 B1 | 6/2008 | Chen et al. |
| 7,491,770 B2 | 2/2009 | Autran et al. |
| 7,597,773 B2 | 10/2009 | Kume et al. |
| 7,645,312 B2 | 1/2010 | Hamlin et al. |
| 7,781,527 B2 | 8/2010 | Autran et al. |
| 7,918,913 B2 | 4/2011 | Kalayci et al. |
| 7,960,478 B2 | 6/2011 | Autran et al. |
| 7,985,344 B2 | 7/2011 | Dema et al. |
| 7,985,802 B2 | 7/2011 | Chien et al. |
| 7,993,427 B2 | 8/2011 | Hassmann et al. |
| 8,012,565 B2 | 9/2011 | Luo |
| 8,021,455 B2 | 9/2011 | Adamek et al. |
| 8,080,086 B2 | 12/2011 | Graber et al. |
| 8,142,535 B2 | 3/2012 | Grove |
| 8,172,092 B2 | 5/2012 | Green et al. |
| 8,178,199 B2 | 5/2012 | Gupta et al. |

(56) References Cited

U.S. PATENT DOCUMENTS

| | | | |
|---|---|---|---|
| 8,277,529 B2 | 10/2012 | Rogers et al. |
| 8,308,834 B2 | 11/2012 | Smithies et al. |
| 8,366,797 B2 | 2/2013 | Chung et al. |
| 8,373,016 B2 | 2/2013 | Kasai et al. |
| 8,395,016 B2 | 3/2013 | Isele et al. |
| 8,415,262 B2 | 4/2013 | Bletsos et al. |
| 8,444,814 B2 | 5/2013 | Levit et al. |
| 8,444,816 B2 | 5/2013 | Amma et al. |
| 8,512,432 B2 | 8/2013 | Jones et al. |
| 8,512,569 B2 | 8/2013 | Eaton et al. |
| 8,535,404 B2 | 9/2013 | Crabtree et al. |
| 8,545,587 B2 | 10/2013 | Guimond et al. |
| 8,556,089 B2 | 10/2013 | Kalayci et al. |
| 8,563,449 B2 | 10/2013 | Mueller et al. |
| 8,608,817 B2 | 12/2013 | Wertz et al. |
| 8,632,658 B2 | 1/2014 | Miller et al. |
| 8,662,316 B2 | 3/2014 | Sakadume et al. |
| 8,668,758 B2 | 3/2014 | Duello et al. |
| 8,689,985 B2 | 4/2014 | Bates et al. |
| 8,716,549 B2 | 5/2014 | Cheng et al. |
| 8,753,483 B2 | 6/2014 | Godsay et al. |
| 8,758,559 B2 | 6/2014 | Vallery |
| 8,759,606 B2 | 6/2014 | Bond et al. |
| 8,802,229 B2 | 8/2014 | Luo |
| 8,840,791 B2 | 9/2014 | Wang et al. |
| 8,859,843 B2 | 10/2014 | Tee, Jr. et al. |
| 8,882,876 B2 | 11/2014 | Battenfeld et al. |
| 8,950,587 B2 * | 2/2015 | Thomson | B01D 39/1623 210/490 |
| 8,951,420 B2 * | 2/2015 | Godsay | B01D 39/163 210/490 |
| 8,986,432 B2 | 3/2015 | Wertz et al. |
| 9,283,501 B2 | 3/2016 | Wertz et al. |
| 9,511,330 B2 * | 12/2016 | Yu | B01D 71/10 |
| 2001/0003082 A1 | 6/2001 | Kahlbaugh et al. |
| 2001/0035094 A1 | 11/2001 | Takagaki et al. |
| 2002/0013112 A1 | 1/2002 | Bontaites et al. |
| 2002/0056684 A1 | 5/2002 | Klein |
| 2002/0083837 A1 | 7/2002 | Doherty |
| 2002/0193553 A1 | 12/2002 | Qin et al. |
| 2003/0003834 A1 | 1/2003 | Berrigan et al. |
| 2003/0082979 A1 | 5/2003 | Bean et al. |
| 2003/0106294 A1 | 6/2003 | Chung et al. |
| 2003/0150199 A1 | 8/2003 | Tanaka et al. |
| 2003/0168401 A1 | 9/2003 | Koslow |
| 2003/0177909 A1 | 9/2003 | Koslow |
| 2003/0196963 A1 | 10/2003 | Koslow |
| 2003/0196964 A1 | 10/2003 | Koslow |
| 2003/0201231 A1 | 10/2003 | Koslow |
| 2003/0203696 A1 | 10/2003 | Healey |
| 2003/0205529 A1 | 11/2003 | Koslow |
| 2003/0205530 A1 | 11/2003 | Koslow |
| 2003/0205531 A1 | 11/2003 | Koslow |
| 2003/0211802 A1 | 11/2003 | Keck et al. |
| 2003/0213750 A1 | 11/2003 | Koslow |
| 2003/0220039 A1 | 11/2003 | Chen et al. |
| 2003/0226792 A1 | 12/2003 | Tumbrink et al. |
| 2004/0060268 A1 | 4/2004 | Chung et al. |
| 2004/0060269 A1 | 4/2004 | Chung et al. |
| 2004/0083695 A1 | 5/2004 | Schultink et al. |
| 2004/0112023 A1 | 6/2004 | Choi |
| 2004/0116028 A1 | 6/2004 | Bryner |
| 2004/0123572 A1 | 7/2004 | Chung et al. |
| 2004/0135274 A1 | 7/2004 | Matsuda et al. |
| 2004/0163540 A1 | 8/2004 | Mori et al. |
| 2004/0178142 A1 | 9/2004 | Koslow |
| 2004/0187454 A1 | 9/2004 | Chung et al. |
| 2004/0211160 A1 | 10/2004 | Rammig et al. |
| 2004/0226886 A1 | 11/2004 | Hester et al. |
| 2004/0255783 A1 | 12/2004 | Graham et al. |
| 2004/0266300 A1 | 12/2004 | Isele et al. |
| 2005/0006303 A1 | 1/2005 | Sanders |
| 2005/0079379 A1 | 4/2005 | Wadsworth et al. |
| 2005/0109393 A1 | 5/2005 | Anderson |
| 2005/0109554 A1 | 5/2005 | Ishikawa et al. |
| 2005/0109557 A1 | 5/2005 | Dravet et al. |
| 2005/0136292 A1 | 6/2005 | Mariani et al. |
| 2005/0148261 A1 | 7/2005 | Close et al. |
| 2005/0163955 A1 * | 7/2005 | Schaefer | B01D 39/1607 428/36.1 |
| 2005/0193696 A1 * | 9/2005 | Muller | B01D 46/0032 55/486 |
| 2005/0217226 A1 | 10/2005 | Sundet et al. |
| 2005/0235619 A1 | 10/2005 | Heinz et al. |
| 2005/0240517 A1 | 10/2005 | Wolzenski et al. |
| 2005/0241598 A1 | 11/2005 | Ezaki |
| 2005/0250726 A1 | 11/2005 | Krieg et al. |
| 2005/0266760 A1 | 12/2005 | Chhabra et al. |
| 2006/0000196 A1 | 1/2006 | Beier et al. |
| 2006/0096260 A1 | 5/2006 | Bryner et al. |
| 2006/0096932 A1 * | 5/2006 | Dema | B01D 27/06 210/767 |
| 2006/0137317 A1 | 6/2006 | Bryner et al. |
| 2006/0137318 A1 | 6/2006 | Lim et al. |
| 2006/0138059 A1 | 6/2006 | Vair et al. |
| 2006/0205306 A1 | 9/2006 | Rock et al. |
| 2006/0230731 A1 | 10/2006 | Kalayci |
| 2006/0272303 A1 * | 12/2006 | Fujiwara | B01D 39/1623 55/486 |
| 2006/0277877 A1 | 12/2006 | Shields |
| 2006/0292947 A1 | 12/2006 | LaVietes et al. |
| 2007/0021021 A1 | 1/2007 | Verdegan et al. |
| 2007/0039300 A1 | 2/2007 | Kahlbaugh et al. |
| 2007/0054579 A1 | 3/2007 | Baker et al. |
| 2007/0065643 A1 | 3/2007 | Kopacz et al. |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0084787 A1 | 4/2007 | Gross et al. |
| 2007/0125700 A1 | 6/2007 | Ding et al. |
| 2007/0138698 A1 | 6/2007 | Gerndt et al. |
| 2007/0190319 A1 | 8/2007 | Kalayci |
| 2007/0220852 A1 | 9/2007 | Lifshutz et al. |
| 2007/0264520 A1 | 11/2007 | Wood et al. |
| 2007/0271883 A1 | 11/2007 | Chung et al. |
| 2007/0283808 A1 | 12/2007 | Chung et al. |
| 2008/0017038 A1 | 1/2008 | Wu |
| 2008/0022643 A1 | 1/2008 | Fox et al. |
| 2008/0026661 A1 | 1/2008 | Fox et al. |
| 2008/0032110 A1 | 2/2008 | Wood et al. |
| 2008/0060328 A1 | 3/2008 | Devine |
| 2008/0073296 A1 | 3/2008 | Dema et al. |
| 2008/0105626 A1 | 5/2008 | Jones et al. |
| 2008/0108265 A1 | 5/2008 | Pourdeyhimi et al. |
| 2008/0110822 A1 | 5/2008 | Chung et al. |
| 2008/0134652 A1 | 6/2008 | Lim et al. |
| 2008/0160856 A1 | 7/2008 | Chen et al. |
| 2008/0302072 A1 | 12/2008 | Hassmann et al. |
| 2008/0302242 A1 | 12/2008 | Schelling et al. |
| 2008/0314009 A1 | 12/2008 | Ziebold et al. |
| 2008/0314010 A1 | 12/2008 | Smithies et al. |
| 2009/0017710 A1 | 1/2009 | Bugada et al. |
| 2009/0032475 A1 * | 2/2009 | Ferrer | B01D 17/10 210/799 |
| 2009/0039013 A1 | 2/2009 | Sakadume et al. |
| 2009/0042475 A1 | 2/2009 | Pourdeyhimi |
| 2009/0044702 A1 | 2/2009 | Adamek et al. |
| 2009/0050578 A1 * | 2/2009 | Israel | B01D 39/1615 210/767 |
| 2009/0077938 A1 | 3/2009 | Kume et al. |
| 2009/0078637 A1 | 3/2009 | Shane |
| 2009/0118451 A1 | 5/2009 | Fuchs et al. |
| 2009/0120048 A1 * | 5/2009 | Wertz | B01D 39/1623 55/521 |
| 2009/0120868 A1 | 5/2009 | Huppchen et al. |
| 2009/0142234 A1 | 6/2009 | Tatarchuk et al. |
| 2009/0266759 A1 | 10/2009 | Green |
| 2009/0301304 A1 | 12/2009 | Bass et al. |
| 2010/0000411 A1 | 1/2010 | Wertz et al. |
| 2010/0006498 A1 | 1/2010 | Duello et al. |
| 2010/0031618 A1 | 2/2010 | Grove, III |
| 2010/0044289 A1 | 2/2010 | Koslow |
| 2010/0107881 A1 | 5/2010 | Healey et al. |
| 2010/0133173 A1 | 6/2010 | Ingaki |

(56) References Cited

U.S. PATENT DOCUMENTS

| | | |
|---|---|---|
| 2010/0187171 A1 | 7/2010 | Gupta |
| 2010/0187712 A1 | 7/2010 | Gupta et al. |
| 2010/0233927 A1 | 9/2010 | Standaert |
| 2010/0252510 A1 | 10/2010 | Godsay et al. |
| 2010/0282682 A1 | 11/2010 | Eaton et al. |
| 2010/0285101 A1 | 11/2010 | Moore et al. |
| 2010/0297720 A1 | 11/2010 | Medoff et al. |
| 2010/0323573 A1 | 12/2010 | Chu et al. |
| 2011/0059668 A1 | 3/2011 | Bieser et al. |
| 2011/0079553 A1 | 4/2011 | Thomson et al. |
| 2011/0139706 A1 | 6/2011 | Kalayci et al. |
| 2011/0147976 A1 | 6/2011 | Wertz et al. |
| 2011/0210059 A1 | 9/2011 | Green et al. |
| 2011/0215046 A1 | 9/2011 | Rogers et al. |
| 2011/0259813 A1 | 10/2011 | Wertz et al. |
| 2012/0108714 A1 | 5/2012 | Wittner |
| 2012/0152821 A1 | 6/2012 | Cox et al. |
| 2012/0152824 A1 | 6/2012 | Cox et al. |
| 2012/0152859 A1 | 6/2012 | Bettenfeld et al. |
| 2012/0175074 A1 | 7/2012 | Gupta et al. |
| 2012/0204527 A1 | 8/2012 | Chung et al. |
| 2012/0213926 A1 | 8/2012 | Lauer et al. |
| 2012/0219766 A1 | 8/2012 | Gupta et al. |
| 2012/0234748 A1 | 9/2012 | Little et al. |
| 2012/0302120 A1 | 11/2012 | Clark et al. |
| 2012/0318754 A1 | 12/2012 | Cox et al. |
| 2013/0001154 A1 | 1/2013 | Chung et al. |
| 2013/0001155 A1 | 1/2013 | Neubauer et al. |
| 2013/0041335 A1 | 2/2013 | Dwiggins et al. |
| 2013/0101477 A1 | 4/2013 | Both et al. |
| 2013/0115837 A1 | 5/2013 | Kitchen et al. |
| 2013/0126418 A1 | 5/2013 | Lim et al. |
| 2013/0139691 A1 | 6/2013 | Goldbach et al. |
| 2013/0168893 A1 | 7/2013 | Jaganathan et al. |
| 2013/0233789 A1 | 9/2013 | Parker |
| 2013/0269294 A1 | 10/2013 | Benton et al. |
| 2013/0340398 A1 | 12/2013 | Battenfeld et al. |
| 2013/0340613 A1 | 12/2013 | Krupnikov et al. |
| 2013/0341290 A1 | 12/2013 | Yu et al. |
| 2014/0083926 A1 | 3/2014 | Winters et al. |
| 2014/0110354 A1 | 4/2014 | Haberkamp et al. |
| 2014/0166572 A1 | 6/2014 | Snyder |
| 2014/0224727 A1 | 8/2014 | Yu et al. |
| 2014/0259483 A1 | 9/2014 | Cheng et al. |
| 2014/0259579 A1 | 9/2014 | Cheng et al. |
| 2014/0272223 A1 | 9/2014 | Cheng et al. |
| 2014/0272261 A1 | 9/2014 | Udengaard et al. |
| 2014/0272359 A1 | 9/2014 | Cheng et al. |
| 2014/0273704 A1 | 9/2014 | Baer et al. |
| 2014/0276512 A1 | 9/2014 | Cheng et al. |
| 2014/0326661 A1 | 11/2014 | Madsen et al. |
| 2014/0346107 A1 | 11/2014 | Anantharamaiah et al. |
| 2014/0202123 A1 | 12/2014 | Rydstrom et al. |
| 2015/0174509 A1 | 6/2015 | Swaminathan |
| 2015/0182893 A1 | 7/2015 | Godsay et al. |
| 2015/0360156 A1 | 12/2015 | Swaminathan |
| 2016/0002484 A1 | 1/2016 | Geisen et al. |
| 2016/0023146 A1 | 1/2016 | Hampton et al. |
| 2016/0038864 A1 | 2/2016 | Calcaterra et al. |
| 2016/0158677 A1 | 6/2016 | Cox et al. |
| 2016/0184751 A1 | 6/2016 | Wertz et al. |

FOREIGN PATENT DOCUMENTS

| | | |
|---|---|---|
| DE | 102 45 124 A1 | 2/2004 |
| DE | 10 2005 055 607 B3 | 3/2007 |
| DE | 20 2005 019 004 U1 | 4/2007 |
| DE | 10 2005 059 214 B4 | 10/2007 |
| DE | 10 2006 017 553 B3 | 12/2007 |
| DE | 20 2007 015 994 U1 | 1/2008 |
| DE | 10 2009 054 084 A1 | 5/2011 |
| EP | 0 109 282 A2 | 9/1988 |
| EP | 0 462 574 A1 | 12/1991 |
| EP | 0 612 551 A2 | 8/1994 |
| EP | 0 587 682 B1 | 4/1995 |
| EP | 0 391 661 B1 | 9/1995 |
| EP | 1 048 335 A1 | 11/2000 |
| EP | 1 236 494 B1 | 9/2002 |
| EP | 1 048 335 B1 | 4/2005 |
| EP | 1 721 555 A1 | 11/2006 |
| EP | 1 775 006 A1 | 4/2007 |
| EP | 1 795 248 A2 | 3/2008 |
| EP | 1 483 039 B1 | 4/2008 |
| JP | 2002-001027 A | 1/2002 |
| JP | 2008-095266 A | 4/2008 |
| WO | WO 00/02006 A2 | 1/2000 |
| WO | WO 00/056665 A1 | 9/2000 |
| WO | WO 01/21279 A1 | 3/2001 |
| WO | WO 01/98574 A2 | 12/2001 |
| WO | WO 02/16681 A1 | 2/2002 |
| WO | WO 02/20668 A2 | 3/2002 |
| WO | WO 03/064006 A1 | 8/2003 |
| WO | WO 03/064013 A1 | 8/2003 |
| WO | WO 2004/028662 A2 | 4/2004 |
| WO | WO 2004/069378 A2 | 8/2004 |
| WO | WO 2004/112937 A1 | 12/2004 |
| WO | WO 2005/034659 A2 | 4/2005 |
| WO | WO 2006/030407 A1 | 3/2006 |
| WO | WO 2006/049664 A1 | 5/2006 |
| WO | WO 2006/053295 A1 | 5/2006 |
| WO | WO 2006/071979 A1 | 7/2006 |
| WO | WO 2006/071980 A1 | 7/2006 |
| WO | WO 2006/074383 A2 | 7/2006 |
| WO | WO 2006/096180 A1 | 9/2006 |
| WO | WO 2007/024445 A1 | 3/2007 |
| WO | WO 2007/041310 A2 | 4/2007 |
| WO | WO 2007/041311 A2 | 4/2007 |
| WO | WO 2007/068302 A1 | 6/2007 |
| WO | WO 2007/068408 A1 | 6/2007 |
| WO | WO 2007/068444 A1 | 6/2007 |
| WO | WO 2007/076015 A2 | 7/2007 |
| WO | WO 2007/112443 A2 | 10/2007 |
| WO | WO 2008/011450 A1 | 1/2008 |
| WO | WO 2008/016771 A1 | 2/2008 |
| WO | WO 2008/057397 A1 | 5/2008 |
| WO | WO 2008/057431 A2 | 5/2008 |
| WO | WO 2008/066813 A2 | 6/2008 |
| WO | WO 2008/103736 A1 | 8/2008 |
| WO | WO 2008/150548 A2 | 12/2008 |
| WO | WO 2009/085679 A1 | 7/2009 |
| WO | WO 2011/058118 A1 | 5/2011 |
| WO | WO 2011/160756 A2 | 12/2011 |
| WO | WO 2011/160829 A2 | 12/2011 |
| WO | WO 2013/132161 A2 | 9/2013 |

OTHER PUBLICATIONS

Brochure by Parker Hannifan, "Micron Rating", date and author unavailable.*

Racor brochure #7550 by Parker Hannifan Corporation, "Filtration in Brief", date and author unavailable.*

Publication by Frazier Precision Instrument Company, The Differential-Pressure Air PermeabilityTest for use in the Non-woven, Filter and Paper Industries, reprinted from Tappi Journal, vol. 76, No. 11, Nov. 1993. Thomas Scrivener.*

International Search Report and Written Opinion for Application No. PCT/US2008/082759 dated Aug. 4, 2009.

International Preliminary Report on Patentability for Application No. PCT/US2008/082759 dated May 20, 2010.

European Search Report for EP 10759158.8 dated Dec. 5, 2012.

International Search Report and Written Opinion for Application No. PCT/US2010/000996 dated Nov. 29, 2010.

International Preliminary Report on Patentability for Application No. PCT/US2010/000996 dated Oct. 13, 2011.

Extended European Search Report for EP 11775517.3 dated Oct. 9, 2013.

International Search Report and Written Opinion for PCT/US2011/034074 dated Jul. 11, 2011.

International Preliminary Report on Patentability for PCT/US2011/034074 dated Nov. 8, 2012.

International Search Report and Written Opinion for PCT/US2011/065499 dated Apr. 20, 2012.

(56) References Cited

OTHER PUBLICATIONS

International Preliminary Report on Patentability for Application No. for PCT/US2011/065499 dated Jun. 27, 2013.
International Search Report and Written Opinion for Application No. PCT/US2011/054898 dated Feb. 27, 2012.
International Preliminary Report on Patentability for Application No. PCT/US2011/054898 dated Feb. 27, 2014.
International Search Report and Written Opinion for PCT/US2013/046746 dated Nov. 5, 2013.
[No Author Listed] Global industrial solutions, vacuum dehydration oil purification system. Brochure. Date not available.
[No Author Listed] Utipor III filter element speficiations. Pall Corporation. Date not available. pp. 15-19.
[No Author Listed] Vaccum dehydration oil purification system. Brochure. Oil Filtration Systems, Inc. Date unavailable.
Berkalp, Air Permeability & Porosity in Spun-laced Fabrics. Fibres and Textiles in Eastern Europe. 2006; 14(3): 81-5.
Dahiya et al., Melt Blown Technology. Apr. 2004. 13 pages.
Keith et al., The Surface Area of Fibrous Filters. Tobacco Science. 1977;68-72. Accessed Sep. 19, 2013.
Extended European Search Report for EP Application No. 11831504.3 dated Jul. 15, 2016.

\* cited by examiner

| Sample # | Layer3 Meltblown Grammage (g/m²) | Layer3 Meltblown Frazier Permeability (ft³/ft²) | Layer3 Meltblown Thickness (mm) | Layer3 Meltblown Avg. Fiber Diameter (µm) | Layer3/Layer2 Normalized Resistance Ratio | Layer3+Layer2 Composite Micron Rating (µm(c) @ Beta=200) | Layer3+Layer2 Composite DHC (g/m²) | Layer2 Glass Grammage (g/m²) | Layer2 Glass Frazier Permeability (ft³/ft²) | Layer2 Glass Avg. Fiber Diameter (µm) | Layer2/Layer1 Normalized Resistance Ratio | Layer1 Glass Grammage (g/m²) |
|---|---|---|---|---|---|---|---|---|---|---|---|---|
| 1 | 19 | 68.9 | 0.095 | 0.096 | 3 | 10.4 | 142.70 | 65.1 | 60 | 4.3 | 4 | 32.5 |
| 2 | 19 | 68.9 | 0.095 | 0.096 | 3 | | | 32.5 | 119 | 4.3 | 4 | 65.1 |
| 3 | 19 | 68.9 | 0.095 | 0.096 | 5 | 10.9 | 165.92 | 32.5 | 198 | 5.1 | 2 | 65.1 |
| 4 | 19 | 68.9 | 0.095 | 0.096 | 3 | | | 32.5 | 119 | 4.3 | 2 | 65.1 |
| 5 | 19 | 68.9 | 0.095 | 0.096 | 3 | 9.9 | 164.94 | 65.1 | 60 | 4.3 | 2 | 32.5 |
| 6 | 19 | 68.9 | 0.095 | 0.096 | 5 | 11.3 | 181.83 | 65.1 | 99 | 5.1 | 4 | 32.5 |
| 7 | 19 | 68.9 | 0.095 | 0.096 | 5 | 11.4 | 194.72 | 65.1 | 99 | 5.1 | 2 | 32.5 |
| 8 | 20 | 64 | 0.095 | 0.096 | 3 | | | 32.5 | 115 | 4.1 | 5 | 48.8 |
| 9 | 20 | 64 | 0.095 | 0.096 | 4 | | | 16.3 | 307 | 4.7 | 4 | 65.1 |
| 10 | 20 | 64 | 0.095 | 0.096 | 4 | | | 16.3 | 307 | 4.7 | 6 | 65.1 |
| 11 | 20 | 64 | 0.095 | 0.096 | 2 | | | 16.3 | 153 | 2.9 | 6 | 65.1 |
| 12 | 20 | 64 | 0.095 | 0.096 | 2 | | | 16.3 | 153 | 2.9 | 4 | 65.1 |
| 13 | 20 | 64 | 0.095 | 0.096 | 4 | | | 48.8 | 102 | 4.7 | 6 | 32.5 |
| 14 | 20 | 64 | 0.095 | 0.096 | 2 | | | 48.8 | 51 | 2.9 | 4 | 32.5 |
| 15 | 20 | 64 | 0.095 | 0.096 | 3 | | | 32.5 | 115 | 4.1 | 5 | 48.8 |
| 16 | 20 | 64 | 0.095 | 0.096 | 4 | | | 48.8 | 102 | 4.7 | 4 | 32.5 |
| 17 | 20 | 64 | 0.095 | 0.096 | 2 | | | 48.8 | 51 | 2.9 | 6 | 32.5 |

FIG. 3A

| Sample # | Layer1 Glass Frazier Permeability (ft³/ft²) | Layer1 Glass Avg. Fiber Diameter (μm) | Layer1+Layer2 Glass Grammage (g/m²) | Layer1+Layer2 Glass Frazier Permeability (ft³/ft²) | Layer1+Layer2 Glass Thickness (mm) | Total (1+2+3) Composite Grammage (g/m²) | Total (1+2+3) Composite Frazier Permeability (ft³/ft²) | Total (1+2+3) Composite Thickness (mm) | Total (1+2+3) Composite Micron Rating (μm(c) @ Beta=200) | Total (1+2+3) Composite DHC (g/m²) | Total (1+2+3) Composite Absolute DHC (g/g) |
|---|---|---|---|---|---|---|---|---|---|---|---|
| 1 | 476 | 5.5 | 97.6 | 53 | 0.752 | 116.4 | 29.9 | 0.847 | 10.3 | 234.0 | 2.0 |
| 2 | 238 | 5.5 | 97.6 | 79 | 0.853 | 116.4 | 36.9 | 0.948 | 10.0 | 210.1 | 1.8 |
| 3 | 198 | 5.8 | 97.6 | 99 | 0.723 | 116.4 | 40.7 | 0.818 | 10.6 | 192.2 | 1.7 |
| 4 | 119 | 5.3 | 97.6 | 60 | 0.723 | 116.4 | 31.9 | 0.818 | 10.6 | 217.7 | 1.9 |
| 5 | 238 | 5.3 | 97.6 | 48 | 0.773 | 116.4 | 28.2 | 0.868 | 13.9 | 256.7 | 2.2 |
| 6 | 794 | 6.0 | 97.6 | 88 | 0.730 | 116.4 | 38.7 | 0.825 | 10.3 | 199.3 | 1.7 |
| 7 | 397 | 5.1 | 97.6 | 79 | 0.795 | 116.4 | 36.9 | 0.890 | 10.8 | 201.1 | 1.7 |
| 8 | 384 | 5.8 | 81.4 | 89 | 0.639 | 100.9 | 37.1 | 0.734 | 10.5 | 199.8 | 2.0 |
| 9 | 307 | 5.9 | 81.4 | 153 | 0.623 | 100.9 | 45.2 | 0.718 | 10.6 | 172.9 | 1.7 |
| 10 | 460 | 6.2 | 81.4 | 184 | 0.648 | 100.9 | 47.5 | 0.743 | 10.7 | 168.4 | 1.7 |
| 11 | 230 | 5.5 | 81.4 | 92 | 0.721 | 100.9 | 37.8 | 0.816 | 9.7 | 180.7 | 1.8 |
| 12 | 153 | 5.3 | 81.4 | 77 | 0.690 | 100.9 | 34.9 | 0.785 | 12.0 | 231.4 | 2.3 |
| 13 | 920 | 6.2 | 81.4 | 92 | 0.621 | 100.9 | 37.8 | 0.716 | 10.9 | 221.6 | 2.2 |
| 14 | 307 | 5.3 | 81.4 | 44 | 0.714 | 100.9 | 26.0 | 0.809 | 9.0 | 238.0 | 2.4 |
| 15 | 384 | 5.8 | 81.4 | 89 | 0.643 | 100.9 | 37.1 | 0.738 | 9.8 | 224.9 | 2.2 |
| 16 | 614 | 5.9 | 81.4 | 88 | 0.647 | 100.9 | 37.0 | 0.742 | 10.3 | 192.1 | 1.9 |
| 17 | 460 | 5.5 | 81.4 | 46 | 0.651 | 100.9 | 26.8 | 0.746 | 9.1 | 151.2 | 1.5 |

FIG. 3B

FILTER MEDIA SUITABLE FOR HYDRAULIC APPLICATIONS

RELATED APPLICATIONS

This application is a continuation of U.S. application Ser. No. 12/899,512, filed Oct. 6, 2010, which is a continuation-in-part of U.S. application Ser. No. 12/418,375, filed Apr. 3, 2009, which are incorporated herein by reference in their entirety.

FIELD OF INVENTION

The present invention relates generally to filter media which may be used in hydraulic applications and, more particularly, to multilayered filter media which have desirable performance characteristics.

BACKGROUND

Filter media can be used to remove contamination in a variety of applications. Depending on the application, the filter media may be designed to have different performance characteristics. For example, filter media may be designed to have performance characteristics suitable for hydraulic applications which involve filtering contamination in pressurized fluids.

In general, filter media can be formed of a web of fibers. For example, the web may include microglass fibers amongst other components. The fiber web provides a porous structure that permits fluid (e.g., hydraulic fluid) to flow through the filter media. Contaminant particles contained within the fluid may be trapped on the fibrous web. Filter media characteristics, such as fiber diameter and basis weight, affect filter performance including filter efficiency, dirt holding capacity and resistance to fluid flow through the filter.

There is a need for filter media that can be used in hydraulic applications which has a desirable balance of properties including a high dirt holding capacity and a low resistance to fluid flow (high permeability) across the filter media.

SUMMARY OF THE INVENTION

Filter media, including those suitable for hydraulic applications, and related components, systems, and methods associated therewith are provided.

In one set of embodiments, a series of filter media are provided. In one embodiment, a filter media includes at least two layers. A first layer of the filter media comprises at least 80 wt % glass fibers, wherein the fibers in the first layer have a first average diameter. The filter media also includes a second layer directly adjacent the first layer, the second layer comprising glass fibers, wherein the fibers in the second layer have a second average diameter. The second average diameter is smaller than the first average diameter. A normalized resistance ratio of the second layer to the first layer is between 1:1 and 5:1.

In another embodiment, a filter media includes at least three layers. A first layer of the filter media comprises glass fibers, the fibers in the first layer having a first average diameter. A second layer of the filter media comprises glass fibers, the fibers in the second layer having a second average diameter, wherein the second average diameter is smaller than the first average diameter. A third layer of the filter media comprises glass fibers, the fibers in the third layer having a third average diameter, wherein the third average diameter is smaller than the second average diameter. The second layer may be directly adjacent the first and third filter layers. A normalized resistance ratio of the second layer to the first layer is between 1:1 and 15:1.

In another embodiment, a filter media includes at least three layers. A first layer of the filter media comprises glass fibers, the fibers in the first layer having a first average diameter. A second layer of the filter media is adjacent the first layer and comprises glass fibers, the fibers in the second layer having a second average diameter. A third layer of the filter media is adjacent the second layer and comprises glass fibers, the fibers in the third layer having a third average diameter. The filter media has an absolute specific capacity at 10 microns of greater than about 2.65.

In another embodiment, a filter media includes at least three layers. A first layer of the filter media comprises glass fibers, the fibers in the first layer having a first average diameter. A second layer of the media is adjacent the first layer comprising glass fibers, the fibers in the second layer having a second average diameter. The first and second layers have a combined basis weight of less than 75 g/m² and an absolute specific capacity at 10 microns of greater than about 3.4.

In another embodiment, a filter media includes at least three layers. A first layer of the filter media comprises at least 90 wt % glass fibers, the first layer having a basis weight of greater than about 40 g/m². A second layer of the filter media is adjacent the first layer and comprises at least 90 wt % glass fibers, the second layer having a basis weight of less than about 40 g/m². A third layer of the filter media is adjacent the second layer and comprises at least 90 wt % glass fibers.

In another embodiment, a filter media includes a first layer comprising glass fibers, wherein the fibers in the first layer have a first average diameter. The filter media also includes a second layer adjacent to the first layer, the second layer comprising glass fibers. The fibers in the second layer have a second average diameter, and the first average diameter is greater than the second average diameter. The filter media also includes a third layer adjacent to the second layer, the third layer comprising synthetic polymer fibers. The fibers in the third layer have a third average diameter, wherein the second average diameter is greater than the third average diameter. The third layer has a thickness of less than about 200 microns.

In another embodiment, a filter media includes a first layer comprising glass fibers, wherein the fibers in the first layer have a first average diameter. The filter media also includes a second layer adjacent to the first layer, the second layer comprising glass fibers. The fibers in the second layer have a second average diameter, and the first average diameter is greater than the second average diameter. The filter media also includes a third layer adjacent to the second layer. The third layer includes synthetic polymer fibers. The fibers in the third layer have a third average diameter, wherein the second average diameter is greater than the third average diameter. The filter media has an overall dirt holding capacity of at least about 150 g/m² and an overall permeability of greater than about 25 cfm/sf.

In some embodiments, the filter media described above and herein may have a normalized resistance ratio of the second layer to the first layer is 4:1 or greater, and a normalized resistance ratio of the third layer to the second layer is 4:1 or less. For instance, in some cases a normalized resistance ratio of the second layer to the first layer is between 4:1 and 6:1, and a normalized resistance ratio of the third layer to the second layer is between 2:1 and 4:1. The first layer may include less than about 20 wt % synthetic fibers. In some cases, the first layer is a pre-filter layer and has a basis weight greater than the basis weight of the second layer. At least one of the first and second layers may comprises at least about 80 wt % glass fibers. In other embodiments, at least one of the first and second layers comprises at least about 40 wt % or 60 wt % microglass fibers. The microglass fibers may have an average diameter of between 1 µm and 6 µm. The ratio of the first and second average diameters may be less than 2:1. Optionally, the third average diameter may be less than about 1 micron. In certain filter media, at least one of the first, second and third layers may have a basis weight of less than about 40 g/m².

In certain embodiments, the synthetic polymer fibers of a layer may comprise meltblown fibers. The synthetic polymer fibers may comprise a material selected from the group consisting of, for example, polyester, nylon, and polyphenylene sulfide. The third layer may have a thickness of less than about 180 microns. The third layer may have a mean flow pore size of between about 8 microns and about 12 microns and a $Beta_{(10)}=$ at least 200. In some cases, the third layer may have a basis weight of from about 20 g/m² to about 30 g/m².

The filter media described above and herein may have an overall dirt holding capacity of at least about 180 g/m², or at least about 230 g/m². The filter media may have an overall permeability of greater than about 35 cfm/sf, or greater than about 40 cfm/sf. The filter media may have an efficiency of $Beta_{(x)}=$ at least 200 and a mean flow pore size of x±2 microns. The filter media may be used to form a hydraulic filter element in some embodiments. In some such embodiments, the third layer is downstream of the second layer, and the second layer is downstream of the first layer. Other configurations are also possible.

In one set of embodiments, methods are provided. A method of filtering a liquid comprising passing a liquid including particulates through a filter media. The filter media can include one of the filter media described above and/or herein. For instance, the filter media may include at least three layers. In one embodiment, a first layer of the filter media comprises glass fibers, the fibers in the first layer having a first average diameter. A second layer of the filter media comprises glass fibers, the fibers in the second layer having a second average diameter, wherein the second average diameter is smaller than the first average diameter. In some embodiments, a third layer of the filter media comprises glass fibers, the fibers in the third layer having a third average diameter, wherein the third average diameter is smaller than the second average diameter. In other embodiments, the third layer may comprise synthetic polymer fibers. The second layer may be directly adjacent the first and third filter layers. A normalized resistance ratio of the second layer to the first layer may be between 1:1 and 15:1.

Other aspects, embodiments, advantages and features of the invention will become apparent from the following detailed description.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 3A and 3B are tables showing characteristics of filter media having a first layer including glass fibers, a second layer including glass fibers, and a third layer including meltblown fibers, according to one set of embodiments.

DETAILED DESCRIPTION

Filter media, including those suitable for hydraulic applications, and related components, systems, and methods associated therewith are provided. The filter media described herein may include two or more layers, at least one of the layers having a relatively high percentage of microglass fibers. Additionally, the filter media may be designed such that the ratio of average fiber diameters between two layers is relatively small, which can lead to a relatively low resistance ratio between the layers. In some embodiments, at least one layer of the filter media comprises synthetic polymer fibers. Certain filter media described herein may have desirable properties including high dirt holding capacity and a low resistance to fluid flow. The media may be incorporated into a variety of filter element products including hydraulic filters.

Figure 1:
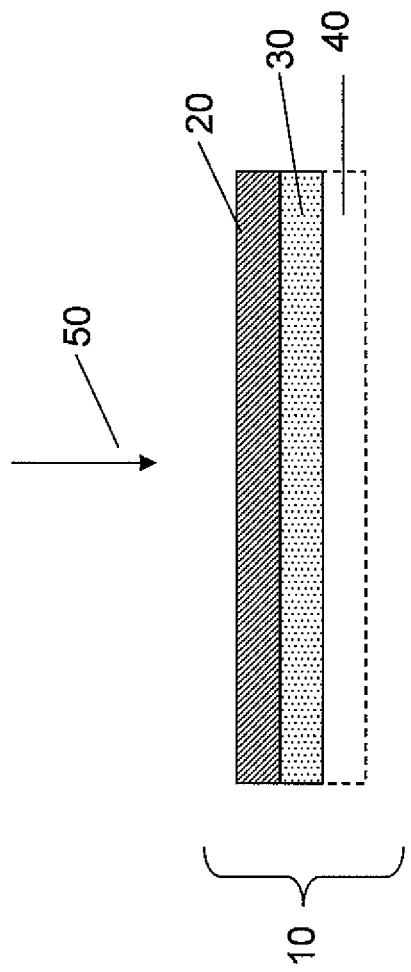
FIG. 1 shows an example of a filter media having multiple layers according to one set of embodiments.

As shown in the embodiment illustrated in FIG. 1, a filter media 10 includes a first layer 20 adjacent a second layer 30. Optionally, filter media 10 can include a third layer 40 adjacent the second layer. Additional layers, e.g., fourth, fifth, or sixth layers, may also be included in some cases. The orientation of filter media 10 relative to fluid flow through the media can generally be selected as desired. As illustrated in FIG. 1, first layer 20 is upstream of second layer 30 in the direction of fluid flow indicated by arrow 50. In other embodiments, however, first layer 20 is downstream of the second layer in the direction of fluid flow through the filter media.

As used herein, when a layer is referred to as being "adjacent" another layer, it can be directly adjacent the layer, or an intervening layer also may be present. A layer that is "directly adjacent" or "in contact with" another layer means that no intervening layer is present.

In some cases, each of the layers of the filter media has different characteristics and filtration properties that, when combined, result in desirable overall filtration performance, for example, as compared to a filter media having a single-layered structure. For example, in one set of embodiments, first layer 20 is a pre-filter layer (also known as an "loading layer") and second layer 30 is a main filter layer (also known as an "efficiency layer"). Generally, a pre-filter layer is formed using coarser fibers, and therefore has a lower resistance to fluid flow, than that of a main filter layer. The one or more main filter layers may include finer fibers and have a higher resistance to fluid flow than that of a pre-filter layer. As such, a main filter layer can generally trap particles of smaller size compared to the pre-filter layer. Where third layer 40 is present, the third layer may be an additional main filter layer that has the same or different properties as second layer 30. For example, the third layer may have even finer fibers and a higher resistance to fluid flow than that of second layer 30. In some embodiments, the third layer comprises synthetic polymer fibers as described in more detail below.

The filter media can also have other configurations of first, second, and optionally third or more layers. For instance, in some cases filter media 10 does not include a pre-filter layer. In some such embodiments, first layer 20 is an upstream main filter layer and second layer 30 is a main filter layer downstream of the first layer. Optionally, the filter media can include third layer 40 (e.g., another main filter layer) positioned downstream of the second layer. An upstream layer may have coarser fibers, and therefore a lower resistance to fluid flow, than that of a layer downstream of that layer. In some cases, the resistance of each layer increases successively from the furthest upstream layer to the furthest downstream layer.

In some embodiments, a layer having relatively coarse fibers may be positioned between two layers having relatively finer fibers. Other configurations are also possible. Additionally, a filter media may include any suitable number of layers, e.g., at least 2, 3, 4, 5, 6, 7, 8, or 9 layers, depending on the particular application and performance characteristics desired.

As noted above, each of the layers of the filter media can have different properties. For instance, the first and second layers can include fibers having different characteristics (e.g., fiber diameters, fiber compositions, and fiber lengths). Fibers with different characteristics can be made from one material (e.g., by using different process conditions) or different materials (e.g., glass fibers, synthetic fibers (e.g., organic polymer fibers), and combinations thereof). Without wishing to be bound by theory, it is believed that a filter media having a multilayered structure with layers including different characteristics exhibits significantly improved performance properties such as dirt holding capacity and/or efficiency compared to a filter media having a single-layered structure.

In certain embodiments, one or more layers of filter media 10 includes microglass fibers, chopped strand glass fibers, or a combination thereof. Microglass fibers and chopped strand glass fibers are known to those skilled in the art. One skilled in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than 1 micron in diameter and coarse microglass fibers are greater than or equal to 1 micron in diameter.

The microglass fibers of one or more layers can have small diameters such as less than 10.0 microns. For example, the average diameter of the microglass fibers in a layer may be between 0.1 microns to about 9.0 microns; and, in some embodiments, between about 0.3 microns and about 6.5 microns, or between about 1.0 microns and 5.0 microns. In certain embodiments, the microglass fibers may have an average fiber diameter of less than about 7.0 microns, less than about 5.0 microns, less than about 3.0 microns, or less than about 1.0 microns. Average diameter distributions for microglass fibers are generally log-normal. However, it can be appreciated that microglass fibers may be provided in any other appropriate average diameter distribution (e.g., Gaussian distribution).

The microglass fibers may vary significantly in length as a result of process variations. The aspect ratios (length to diameter ratio) of the microglass fibers in a layer may be generally in the range of about 100 to 10,000. In some embodiments, the aspect ratio of the microglass fibers in a layer are in the range of about 200 to 2500; or, in the range of about 300 to 600. In some embodiments, the average aspect ratio of the microglass fibers in a layer may be about 1,000; or about 300. It should be appreciated that the above-noted dimensions are not limiting and that the microglass fibers may also have other dimensions.

Coarse microglass fibers, fine microglass fibers, or a combination of microglass fibers thereof may be included within a layer. In some embodiments, coarse microglass fibers make up between about 20% by weight and about 90% by weight of the glass fibers. In some cases, for example, coarse microglass fibers make up between about 30% by weight and about 60% by weight of the glass fibers, or between about 40% by weight and about 60% by weight of the glass fibers. For certain embodiments that include fine microglass fibers, the fine microglass fibers make up between about 0% and about 70% by weight of the glass fibers. In some cases, for example, fine microglass fibers make up between about 5% by weight and about 60% by weight of the glass fibers, or between about 30% by weight and about 50% by weight of the glass fibers.

The chopped strand glass fibers may have an average fiber diameter that is greater than the diameter of the microglass fibers. In some embodiments, the chopped strand glass fiber has a diameter of greater than about 5 microns. For example, the diameter range may be up to about 30 microns. In some embodiments, the chopped strand glass fibers may have a fiber diameter between about 5 microns and about 12 microns. In certain embodiments, the chopped strand fibers may have an average fiber diameter of less than about 10.0 microns, less than about 8.0 microns, less than about 6.0 microns. Average diameter distributions for chopped strand glass fibers are generally log-normal. Chopped strand diameters tend to follow a normal distribution. Though, it can be appreciated that chopped strand glass fibers may be provided in any appropriate average diameter distribution (e.g., Gaussian distribution). In some embodiments, chopped strand glass fibers may have a length in the range of between about 0.125 inches and about 1 inch (e.g., about 0.25 inches, or about 0.5 inches).

It should be appreciated that the above-noted dimensions are not limiting and that the microglass and/or chopped strand fibers may also have other dimensions.

In certain embodiments, the ratio between the weight percentage of microglass fibers and chopped strand glass fibers provides for different characteristics in the filter media. Accordingly, in some embodiments, one or more layers of filter media 10 (e.g., an upstream layer, a downstream layer, a first layer, a second layer, a third layer, etc.) includes a relatively large percentage of microglass fibers compared to chopped strand glass fibers. For example, at least 70 wt %, or at least 80 wt %, at least 90 wt %, at least 93 wt %, at least 95 wt %, at least 97 wt %, or at least 99 wt % of the fibers of a layer may be microglass fibers. In certain embodiments, all of the fibers of a layer are microglass fibers. In other embodiments, however, one or more layers of filter media 10 (e.g., an upstream layer, a downstream layer, a first layer, a second layer, a third layer, etc.) includes a relatively high percentage of chopped strand fibers compared to microglass fibers. For example, at least 50 wt %, at least 60 wt %, at least 70 wt %, or at least 80 wt %, at least 90 wt %, at least 93 wt %, at least 95 wt %, at least 97 wt %, or at least 99 wt % of the fibers of a layer may be chopped strand fibers. Such percentages of chopped strand fibers may be particularly useful in certain embodiments for micron ratings greater than 15 microns for Beta$_{(x)}$=200. In certain embodiments, all of the fibers of a layer are chopped strand fibers.

In some embodiments, one or more layers of filter media 10 (e.g., an upstream layer, a downstream layer, a first layer, a second layer, a third layer, etc.) includes a relatively large percentage of microglass fiber with respect to all of the components used to form the layer. For example, one or more layers may include at least about 40 wt %, at least about 50 wt %, at least about 60 wt %, at least about 70 wt %, or at least about 80 wt %, at least about 90 wt %, at least about 93 wt %, at least about 95 wt %, at least about 97 wt %, or at least about 99 wt % of microglass fiber. In one particular embodiment, one or more layers includes between about 90 wt % and about 99 wt %, e.g., between about 90 wt % and about 95 wt % microglass fibers. In another embodiment, one or more layers includes between about 40 wt % to about 80 wt % microglass fibers, or between about 60 wt % to about 80 wt % microglass fibers. It should be understood that, in certain embodiments, one or more layers of the filter media do not include microglass fiber within the above-noted ranges or at all.

Any suitable amount of chopped strand fibers can be used in one or more layers of a filter media. In some cases, one or more layers includes a relatively low percentage of chopped strand fibers. For example, one or more layers may include less than 30 wt %, or less than 20 wt %, or less than 10 wt %, or less than 5 wt %, or less than 2 wt %, or less than 1 wt % of chopped strand fiber. In some cases, one or more layers of a filter media does not include any chopped strand fibers. It should be understood that, in certain embodiments, one or more layers of the filter media do not include chopped strand fibers within the above-noted ranges.

One or more layers of filter media 10 may also include microglass fibers having an average fiber diameter within a certain range and making up a certain range of weight percentage of the layer. For instance, one or more layers of a filter media may include microglass fibers having an average fiber diameter of less than 5 microns making up less than about 50%, less than about 40%, less than about 30%, less than about 20%, less than about 10%, or less than about 5% of the microglass fibers of the layer. In some cases, a layer includes 0% of microglass fibers having an average diameter of less than 5 microns. Additionally or alternatively, the one or more layers of the filter media may include microglass fibers having an average fiber diameter of greater than or equal to 5 microns making up greater than about 50%, greater than about 60%, greater than about 70%, greater than about 80%, greater than about 90%, greater than about 93%, or greater than about 97% of the microglass fibers of the layer. In some cases, more than one layer of a filter media includes such properties. It should be understood that, in certain instances, one or more layers of the filter media include microglass fibers within ranges different than those described above.

In other embodiments, one or more layers of a filter media includes relatively fine fibers. For instance, one or more layers of the filter media may include microglass fibers having an average fiber diameter of less than 5 microns making up greater than about 50%, greater than about 60%, greater than about 70%, greater than about 80%, greater than about 90%, greater than about 93%, or greater than about 97% of the microglass fibers of the layer. Additionally or alternatively, the one or more layers of the filter media may include microglass fibers having an average fiber diameter of greater than or equal to 5 microns making up less than about 50%, less than about 40%, less than about 30%, less than about 20%, less than about 10%, or less than about 5% of the microglass fibers of the layer. In some cases, a layer includes 0% of microglass fibers having an average diameter of greater than or equal to 5 microns. In some cases, more than one layer of a filter media includes such properties. It should be understood that, in certain instances, one or more layers of the filter media include microglass fibers within ranges different than those described above.

In certain embodiments, regardless of whether the glass fibers in a layer are microglass or chopped fibers, one or more layers of filter media 10 includes a large percentage of glass fiber (e.g., microglass fibers and/or chopped strand glass fibers). For example, one or more layers (e.g., the first and/or second layers) may comprise at least about 40 wt %, at least about 50 wt %, at least about 60 wt %, at least about 70 wt %, at least about 80 wt %, at least about 90 wt %, or at least about 95 wt % of glass fiber. In some cases, all of the fibers of a layer (e.g., the first and/or second layers) are formed of glass. It should be understood that, in certain embodiments, one or more layers of the filter media do not include glass fiber within the above-noted ranges or at all.

In some embodiments, regardless of whether the fibers in a layer are glass fibers (e.g., microglass or chopped fibers) and/or synthetic fibers, fibers having a fiber diameter less than or equal to 7 microns make up greater than about 60% by weight of the fibers, greater than about 70% by weight of the fibers, or greater than about 80% by weight of the fibers of a layer. In some cases, fibers having a fiber diameter less than or equal to 5 microns make up greater than about 60% by weight of the fibers, greater than about 70% by weight of the fibers, or greater than about 80% by weight of the fibers of a layer. In some cases, fibers having a fiber diameter less than or equal to 3 microns make up greater than about 50% by weight of the fibers, greater than about 60% by weight of the fibers, or greater than about 70% by weight of the fibers of a layer.

In one particular set of embodiments, regardless of whether the fibers in a layer are glass fibers (e.g., microglass or chopped fibers) and/or synthetic fibers, a filter media includes a first layer (e.g., a pre-filter layer) having an average fiber diameter of between about 1.0 microns and about 10.0 microns, e.g., between about 1.0 micron and about 8.0 microns. A second layer of the filter media (e.g., a main filter layer) may have an average fiber diameter of between about 1.0 micron and about 9.0 microns, e.g., between about 0.5 micron and about 5.5 microns. If the filter media includes a third layer (e.g., downstream of the second layer), the third layer may have an average fiber diameter of between about 0.1 microns and about 1.5 microns or between about 0.8 micron and about 5.0 microns, e.g., between about 0.5 micron and about 2.5 microns or between about 0.1 and about 1.5 microns, as described below. Additional layers are also possible.

In some embodiments, the third layer may be formed of fibers having an average diameter of less than about 1.5 microns (e.g., from about 0.1 microns to about 1.5 microns, from about 0.2 microns to about 1.5 microns, from about 0.3 microns to about 1.5 microns, from about 0.3 microns to about 1.4 microns, from about 0.4 microns to about 1.3 microns, from about 0.1 microns to about 0.5 microns, from about 0.1 micron to about 0.2 microns, from about 0.1 microns to about 0.3 microns, from about 0.5 microns to about 1.5 microns, from about 0.5 microns to about 1.0 micron, from about 0.7 microns to about 1.0 micron, from about 0.2 microns to about 0.8 microns, from about 0.2 microns to about 0.5 microns, from about 0.3 microns to about 0.5 microns, from about 0.4 microns to about 0.5 microns, from about 0.4 microns to about 0.6 microns, from about 0.4 microns to about 0.8 microns, from about 0.6 microns to about 0.9 microns, from about 0.2 microns to about 0.4 microns, from about 0.2 microns to about 0.3 microns, from about 0.3 microns to about 0.4 microns).

In some embodiments, a third layer includes fibers formed of a synthetic polymer. In certain embodiments, the third layer is manufactured from a meltblown process, and may be formed of fibers having an average diameter of less than about 1.5 microns (e.g., less than about 1.4 microns, less than about 1.3 microns, less than about 1.2 microns, less than about 1.1 microns, less than about one micron), and/or at least about 0.2 microns (e.g., at least about 0.3 microns, at least about 0.4 microns, at least about 0.5 microns), as measured using scanning electron microscopy. As an example, in some embodiments, the synthetic polymer layer (e.g., meltblown layer) is formed of fibers having an average diameter of from about 0.2 microns to about 1.5 microns (e.g., from about 0.3 microns to about 1.5 microns, from about 0.3 microns to about 1.4 microns, from about 0.4 micron to about 1.3 microns, from about 0.7 microns to about 1.0 micron). As another example, in certain embodiments, the synthetic polymer layer (e.g., meltblown layer) is formed of fibers having an average diameter of from about 0.2 microns to about 1.5 microns (e.g., from about 0.5 microns to about 1.5 microns, from about 0.5 microns to about 1.0 micron, from about 0.2 microns to about 0.8 microns, from about 0.2 microns to about 0.5 microns, from about 0.3 microns to about 0.5 microns, from about 0.4 microns to about 0.5 microns, from about 0.4 microns to about 0.6 microns, from about 0.4 microns to about 0.8 microns, from about 0.2 microns to about 0.4 microns, from about 0.2 microns to about 0.3 microns, from about 0.3 microns to about 0.4 microns). In some cases, for example, if the fibers are meltblown, at least about 5% (e.g., at least about 10%, at least about 25%, at least about 50%, at least about 60%, at least about 75%) of the fibers in the synthetic material extend a distance of at least 0.3 microns in a direction substantially perpendicular to a surface of a third layer.

In some embodiments, the synthetic polymer fibers are formed from a process such as a meltblown, a meltspun, a melt electrospinning and/or a solvent electrospinning process and the fibers have one of the fiber diameter ranges listed above.

In some embodiments, filter media 10 is designed such that the average fiber diameters of each layer are different. For example, the ratio of average fiber diameters between two layers (e.g., between a first layer and a second layer, between a second layer and a third layer, between a first layer and a third layer, or between an upstream layer and a downstream layer, etc.) may be less than 10:1, less than 7:1, less than 5:1, less than 4:1, less than 3:1, less than 2:1, or less than 1:1. Small differences in average fiber diameters between two layers may, in some instances, lead to relatively low resistance ratios between the layers. In turn, relatively low resistance ratios between the layers can result in the filter media having favorable properties such as high dirt holding capacity at relatively low basis weights, as described in more detail below.

Alternatively, two layers may have larger differences in average fiber diameters. For example, the ratio of average fiber diameters between two layers (e.g., between a first layer and a second layer, between a second layer and a third layer, or between a first layer and a third layer, etc.) may be greater than 1:1, greater than 2:1, greater than 3:1, greater than 4:1, greater than 5:1, greater than 7:1, or greater than 10:1.

The third layer may be formed of fibers having an average length. For example, in some embodiments, the third layer may be formed of fibers having an average length from about 0.1 inches to about 1,000 inches or between about 1 inch and about 100 inches.

The fibers in the third layer may have an average aspect ratio. For example, in some embodiments, fibers in a third layer may have an average aspect ratio between about 5 and about 1,000,000 or between about 10 and about 100,000.

The third layer can generally have any suitable thickness. In some embodiments, the third layer is at least about 5 microns (e.g. at least about 10 microns, at least about 20 microns, at least about 30 microns) thick, and/or less than about 500 microns (e.g., less than about 400 microns, less than about 200 microns, less than about 180 microns, less than about 150 microns) thick. For example, the third layer can be from about 5 microns to about 500 microns (e.g., from about 5 microns to about 250 microns, from about 10 microns to about 200 microns, from about 20 microns to about 150 microns, from about 30 microns to about 500 microns, from about 50 microns to about 100 microns) thick. Thickness, as referred to herein, is determined according to TAPPI T411 using an appropriate caliper gauge (e.g., a Model 200-A electronic microgauge manufactured by Emveco, tested at 1.5 psi). In some cases, if the thickness of a layer cannot be determined using an appropriate caliper gauge, visual techniques such as scanning electron microscopy in cross-section view can be used.

The basis weight of the third layer can typically be selected as desired. In some embodiments, the basis weight of the third layer is at least about 1 g/m$^2$ (e.g., at least about 10 g/m$^2$, at least about 25 g/m$^2$), and/or less than about 100 g/m$^2$ (less than about 90 g/m$^2$, less than about 75 g/m$^2$, less than about 40 g/m$^2$, less than about 30 g/m$^2$, less than about 25 g/m$^2$, or less than about 20 g/m$^2$). For example, in certain embodiments, the third layer has a basis weight of from about 1 g/m$^2$ to about 100 g/m$^2$ (e.g., from about 10 g/m$^2$ to about 90 g/m$^2$, from about 20 g/m$^2$ to about 30 g/m$^2$, from about 15 g/m$^2$ to about 40 g/m$^2$, from about 25 g/m$^2$ to about 75 g/m$^2$, from about 2 g/m$^2$ to about 20 g/m$^2$, from about 4 g/m$^2$ to about 12 g/m$^2$).

The mean flow pore size of the third layer can vary as desired. For example, the third layer can have an mean flow pore size that may range between about 5 microns and about 50 microns, between about 10 microns and about 30 microns, between about 10 microns and about 20 microns, between 5 microns and 15 microns, between about 8 microns and about 12 microns, between about 1 micron and about 5 microns, between about 5 microns and about 9 microns, or between about 13 microns and about 17 microns. As used herein, the mean flow pore size refers to the mean flow pore size measured by using a Capillary Flow Porometer manufactured by Porous Materials, Inc in accordance with the ASTM F316-03 standard.

The air permeability of the third layer can also be varied as desired. In some embodiments, the third layer has an air permeability of less than about 500 CFM (e.g., less than about 250 CFM, less than about 200 CFM), and or at least about 20 CFM (e.g., at least about 50 CFM, at least about 100 CFM). For example, in some embodiments, the air permeability of the third layer can be from about 20 CFM to about 500 CFM (e.g., from about 50 CFM to about 250 CFM, from about 100 CFM to about 200 CFM).

As described herein, in addition to or in place of glass fibers, one or more layers of the filter media may include components such as synthetic fibers (e.g., synthetic polymer fibers). For instance, one or more layers of filter media 10 may include a relatively high percentage of synthetic fibers, e.g., at least about 50 wt %, at least about 60 wt %, at least about 70 wt %, at least about 80 wt %, at least about 90 wt %, at least about 95 wt %, at least about 97 wt %, at least about 99 wt %, or 100 wt % synthetic fibers (e.g., synthetic polymer fibers). In some cases, at least two layers of the filter media, or the entire filter media, includes such percentages of synthetic fibers. Advantageously, synthetic fibers may be beneficial for resistance to moisture, heat, long-term aging, and microbiological degradation. In other embodiments, synthetic fibers comprise a small weight percentage of the filter media. For example, one or more layers of the filter media may include less than or equal to about 25 wt %, less than or equal to about 15 wt %, less than or equal to about 5 wt %, or less than or equal to about 2 wt % of synthetic fibers. In some cases, one or more layers of a filter media do not include any synthetic fiber. It should be understood that it may also be possible for synthetic fibers to be incorporated within the filter media outside of the ranges disclosed. The synthetic fibers may enhance adhesion of the glass fibers within the web during processing. Synthetic fibers may be, for example, binder fibers, bicomponent fibers (e.g., bicomponent binder fibers) and/or staple fibers.

In general, the synthetic fibers in any layer may have any suitable composition. In some cases, the synthetic fibers comprise a thermoplastic. Non-limiting examples of the synthetic fibers include PVA (polyvinyl alcohol), polyester (e.g., polybutylene terephthalate, polybutylene naphthalate), polyethylene, polypropylene, acrylic, polyolefin, polyamides (e.g., nylon), rayon, polycarbonates, polyphenylene sulfides, polystyrenes, polybutylene terephthalate, and polyurethanes (e.g., thermoplastic polyurethanes), regenerated cellulose and combinations thereof. Optionally, the polymer(s) may contain fluorine atoms. Examples of such polymers include PVDF and PTFE. It should be appreciated that other appropriate synthetic fibers may also be used. In some embodiments, the synthetic fiber is chemically stable with hydraulic fluids for hydraulic applications. The synthetic fiber may be formed by any suitable process such as meltblown, meltspun, melt electrospinning and/or solvent electrospinning processes.

In one set of embodiments, the synthetic fibers are bicomponent fibers. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. This is particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, and combinations thereof. Other exemplary bicomponent fibers can include split fiber fibers, side-by-side fibers, and/or "island in the sea" fibers.

Alternatively, one or more layers of the filter media can include other fiber types such as cellulose pulp fibers (e.g., wood pulp fibers).

The filter media may also include a binder. The binder typically comprises a small weight percentage of the filter media. For example, the binder may comprise less than about 10 wt %, or less than about 5 wt % (e.g., between about 2 wt % and about 5 wt %) of the filter media. In some embodiments, the binder may be about 4 wt % of the filter media. As described further below, the binder may be added to the fibers in the wet fiber web state. In some embodiments, the binder coats the fibers and is used to adhere fibers to each other to facilitate adhesion between the fibers.

In general, the binder may have any suitable composition. In some embodiments, the binder is resin-based. The binder may be in the form of one or more components, for example, the binder may be in the form of bicomponent fibers such as the ones described above. Though, it should be understood that not all embodiments include all of these components and that other appropriate additives may be incorporated.

In addition to the binder, glass components, and synthetic components described above, the filter media may include a variety of other suitable additives (typically, in small weight percentages) such as, surfactants, coupling agents, cross-linking agents, amongst others.

The fiber media may have a variety of desirable properties and characteristics which make it particularly well-suited for hydraulic applications. However, it should be understood that the filter media described herein are not limited to hydraulic applications, and that the media can be used in other applications such as for air filtration or filtration of other liquids and gases.

Filter media 10, including one or more layers of the filter media, can also have varying basis weights, pore sizes, thicknesses, permeabilities, dirt holding capacities, efficiencies, and pressure drop, depending upon the requirements of a desired application.

The overall basis weight of a filter media can vary depending on factors such as the strength requirements of a given filtering application, the number of layers in the filter media, the position of the layer (e.g., upstream, downstream, middle), and the materials used to form the layer, as well as the desired level of filter efficiency and permissible levels of resistance or pressure drop. In certain embodiments described herein, increased performance (e.g., lower resistance or pressure drop) is observed when the filter media includes multiple layers having different properties, where each layer has a relatively low basis weight, compared to certain single- or multi-layered media. As a result, some such filter media may also have a lower overall basis weight while achieving high performance characteristics. For example, the overall basis weight of a filter media (or of two or more layers of the filter media) may range from between about 20 and 200 $g/m^2$, or between about 90 $g/m^2$ and 150 g/m². In some embodiments, the overall basis weight is less than about 200 g/m², less than about 170 g/m², less than about 150 g/m², less than about 130 g/m², less than about 120 g/m², less than about 110 g/m², less than about 100 g/m², less than about 90 g/m², less than about 80 g/m², less than about 70 g/m², less than about 70 g/m², or less than about 60 g/m². As determined herein, the basis weight of the filter media is measured according to the Technical Association of the Pulp and Paper Industry (TAPPI) Standard T410. The values are expressed in grams per square meter or pounds per 3,000 square feet. Basis weight can generally be measured on a laboratory balance that is accurate to 0.1 grams.

In certain embodiments, one or more of an upstream layer, a downstream layer, a pre-filter layer, a main filter layer, a first layer, a second layer, or a third layer of filter media 10 may have a relatively low basis weight. Decreasing the basis weight of one or more layers can, in some embodiments, allow the filter media to have additional layers (e.g., at least three layers), while keeping the overall basis weight relatively low or within a certain range. For example, the basis weight of one or more such layers (or the combination of two or more layers) may range from between about 10 and about 100 g/m², between about 20 g/m² and about 70 g/m², or between about 20 g/m² and about 50 g/m². In some embodiments, the basis weight of one or more layers such as a first, second and/or third layer (or the combination of two or more layers) of a filter media is less than about 100 g/m², less than about 90 g/m², less than about 80 g/m², less than about 70 g/m², less than about 60 g/m², less than about 50 g/m², less than about 40 g/m², less than about 30 g/m², less than about 20 g/m², or less than about 10 g/m².

In one particular set of embodiments, a filter media includes a first layer (e.g., a pre-filter layer) having a basis weight of between about 5 g/m² and about 70 g/m², e.g., between about 40 g/m² and about 60 g/m². The filter media may include a second layer (e.g., a first main filter layer) adjacent (e.g., directly adjacent) the first layer and have a basis weight between about 5 g/m² and about 70 g/m², e.g., between about 30 g/m² and about 40 g/m². In some cases, the filter media includes a third layer (e.g., a second main filter layer or a synthetic polymer layer) adjacent (e.g., directly adjacent) the second layer, the third layer having a basis weight between about 5 g/m² and about 70 g/m², e.g., between about 30 g/m² and about 40 g/m². Additional layers and ranges of basis weight are also possible.

Generally, the ratio of basis weights between two different layers of a filter media (e.g., between a first layer and a second layer, between a second layer and a third layer, between a first layer and a third layer, etc.) can vary depending on the desired properties of the filter media. In some embodiments, an upstream layer of a filter media (e.g., a pre-filter layer) has a larger basis weight than that of a downstream layer (e.g., a main filter layer). For example, the ratio of basis weights between an upstream layer and a downstream layer may be greater than 1:1, greater than 1.5:1, or greater than 2:1. In other embodiments, however, an upstream layer of a filter media has a smaller basis weight than that of a downstream layer, e.g., the ratio of basis weights between an upstream layer and a downstream layer may be less than 2:1, less than 1.5:1, or less than 1:1. In certain embodiments, the basis weight ratio of an upstream and a downstream layer is 1:1.

The overall thickness of a filter media may be between about 5 mils and 300 mils, e.g., between about 50 mils and about 200 mils. The thickness of a layer of the filter media may be between about 3 mils and about 100 mils, between about 3 mils and about 70 mils, between about 3 mils and about 60 mils, between about 3 mils and about 50 mils, between about 3 mils and about 40 mils, between about 3 mils and about 30 mils, between about 3 mils and about 20 mils, or between about 3 mils and about 10 mils. As described above, thickness is determined according to TAPPI T411 using an appropriate caliper gauge (e.g., a Model 200-A electronic microgauge manufactured by Emveco, tested at 1.5 psi).

In one particular set of embodiments, a filter media includes a first layer (e.g., a pre-filter layer) having a thickness of between about 3 mils and about 70 mils, e.g., between about 15 mils and about 20 mils. The filter media may include a second layer (e.g., a main filter layer) having a thickness of between about 3 mils and about 60 mils, e.g., between about 5 mils and about 10 mils. The filter media may optionally include a third layer (e.g., downstream of the second layer) having a thickness of between about 3 mils and about 60 mils, e.g., between about 5 mils and about 10 mils. Additional layers are also possible.

The air permeability of filter media 10 can usually be selected as desired. In some embodiments, the overall permeability of the filter media, may range from between about 2 cubic feet per minute per square foot (cfm/sf) and about 250 cfm/sf, between about 7 cfm/sf and about 200 cfm/sf, between about 15 cfm/sf and about 135 cfm/sf, between about 15 cfm/sf and about 50 cfm/sf, between about 2 cfm/sf and about 50 cfm/sf, or between about 10 cfm/sf and about 40 cfm/sf. The overall permeability of the filter media may be greater than about 10 cfm/sf, greater than about 20 cfm/sf, greater than about 25 cfm/sf, greater than about 30 cfm/sf, greater than about 35 cfm/sf, greater than about 40 cfm/sf, greater than about 45 cfm/sf, or greater than about 50 cfm/sf. As determined herein, the permeability of the filter media is measured according to TAPPI Method T251. The permeability of a filter media is an inverse function of flow resistance and can be measured with a Frazier Permeability Tester. The Frazier Permeability Tester measures the volume of air per unit of time that passes through a unit area of sample at a fixed differential pressure across the sample. Permeability can be expressed in cubic feet per minute per square foot at a 0.5 inch water differential.

The permeability of each layer of filter media 10 can also vary. In some embodiments, one or more layers of the filter media (e.g., an upstream layer, a downstream layer, a first layer, a second layer, a third layer, etc.) has a permeability of between about 3 cfm/sf and about 4000 cfm/sf, between about 15 cfm/sf and about 700 cfm/sf, between about 4 cfm/sf and about 400 cfm/sf, between about 5 cfm/sf and about 250 cfm/sf, between about 7 cfm/sf and about 200 cfm/sf, between about 150 cfm/sf and about 250 cfm/sf, between about 15 cfm/sf and about 150 cfm/sf, between about 15 cfm/sf and about 50 cfm/sf, or between about 4 cfm/sf and about 60 cfm/sf.

In one particular set of embodiments, a multi-layered filter media includes an overall permeability of between about 2 cfm/sf and about 200 cfm/sf, e.g., between about 3 cfm/sf and about 50 cfm/sf. The filter media may include a first layer (e.g., a pre-filter layer) having a permeability of between about 3 cfm/sf and about 4000 cfm/sf, e.g., between about 15 cfm/sf and about 700 cfm/sf. The filter media may include a second layer (e.g., adjacent a pre-filter layer, if present) having a permeability of between about 4 cfm/sf and about 800 cfm/sf, e.g., between about 7 cfm/sf and about 400 cfm/sf. If the filter media includes a third layer, the permeability of that layer may be between about 2 cfm/sf and about 300 cfm/sf, e.g., between about 4 cfm/sf and about 60 cfm/sf.

In certain embodiments, one or more layers of a filter media has a permeability greater than or equal to about 20 cfm/sf, greater than or equal to about 50 cfm/sf, greater than or equal to about 80 cfm/sf, greater than or equal to about 100 cfm/sf, greater than or equal to about 130 cfm/sf, greater than or equal to about 160 cfm/sf, greater than or equal to about 190 cfm/sf, greater than or equal to about 210 cfm/sf, greater than or equal to about 230 cfm/sf, or greater than or equal to about 250 cfm/sf. In other embodiments, one or more layers of a filter media has a permeability less than or equal to about 250 cfm/sf, less than or equal to about 220 cfm/sf, less than or equal to about 190 cfm/sf, less than or equal to about 160 cfm/sf, less than or equal to about 140 cfm/sf, less than or equal to about 120 cfm/sf, less than or equal to about 100 cfm/sf, less than or equal to about 80 cfm/sf, less than or equal to about 50 cfm/sf, or less than or equal to about 30 cfm/sf. Typically, an upstream layer has a larger permeability (lower resistance) and/or a smaller pressure drop than that of a downstream layer, although other configurations are possible.

In certain embodiments, an upstream layer (e.g., a pre-filter layer or a top layer of a main filter layer) of a filter media has a permeability of greater than or equal to about 100 cfm/sf, greater than or equal to about 150 cfm/sf, or greater than or equal to about 200 cfm/sf, and a downstream layer has a permeability of less than or equal to about 200 cfm/sf, less than or equal to about 150 cfm/sf, less than or equal to about 100 cfm/sf, or less than or equal to about 50 cfm/sf.

Certain filter media can have relatively low resistance ratios or certain ranges of resistance ratios between two layers that provide favorable filtration properties. For instance, the resistance ratio between a second layer, which includes fibers having a small average diameter, and a first layer, which includes fibers having a relatively larger average diameter, may be relatively low. In some cases, the second layer is downstream of the first layer as shown in FIG. 1. For example, in one particular embodiment, the second layer is a main filter layer and the first layer is a pre-filter layer. In another embodiment, the second layer is a downstream main filter layer and the first layer is an upstream filter layer. Other combinations are also possible. The resistance ratio between two layers (e.g., between a second layer and a first layer, between a downstream layer and an upstream layer, between a main layer and a pre-filter layer, or between two main layers, etc.), calculated as the resistance of the layer having a relatively smaller average fiber diameter to the resistance of the layer having a relatively larger average fiber diameter, may be, for example, between 0.5:1 and 15:1, between 1:1 and 10:1, between 1:1 and 7:1, between 1:1 and 5:1, or between 1:1 and 3.5:1. In some cases, the resistance ratio between the two layers is less than 15:1, less than 12:1, less than 10:1, less than 8:1, less than 6:1, less than 5:1, less than 4:1, less than 3:1, or less than 2:1, e.g., while being above a certain value, such as greater than 0.01:1, greater than 0.1:1, or greater than 1:1. Advantageously, certain ranges of resistance ratios (including low resistance ratios in some embodiments) can result in the filter media having favorable properties such as high dirt holding capacity and/or high efficiency, while maintaining a relatively low overall basis weight. Such characteristics can allow the filter media to be used in a variety of applications.

In one particular set of embodiments, the resistance ratio between a main filter layer and a pre-filter layer adjacent (e.g., directly adjacent) the main filter layer of a filter media is between 0.5:1 and 7:1, between 1:1 and 5:1, or between 1:1 and 3.5:1. If the filter media includes another main filter layer, the resistance ratio between the downstream main filter layer to the upstream main filter layer may be between 1:1 and 12:1, between 1:1 and 8:1, between 1:1 and 6:1, or between 1:1 and 4:1. Additional layers are also possible.

The resistance of a layer may be normalized against the basis weight of the layer to produce a normalized resistance (e.g., resistance of a layer divided by the basis weight of the layer). In some cases, a normalized resistance ratio between two layers, e.g., a second layer, which includes fibers having a small average diameter, and a first layer, which includes fibers having a relatively larger average diameter, is relatively low. For example, in one particular embodiment, the second layer is a main filter layer and the first layer is a pre-filter layer. In another embodiment, the second layer is a downstream main filter layer and the first layer is an upstream filter layer. Other combinations are also possible. The normalized resistance ratio between two layers (e.g., between a second layer and a first layer, between a downstream layer and an upstream layer, between a main layer and a pre-filter layer, or between two main layers, etc.), calculated as the normalized resistance of the layer having a relatively smaller average fiber diameter to the normalized resistance of the layer having a relatively larger average fiber diameter, may be, for example, between 1:1 and 15:1, between 1:1 and 10:1, between 1:1 and 8:1, between 1:1 and 5:1, or between 1:1 and 3:1. In some cases, the normalized resistance ratio between the two layers is less than 15:1, less than 12:1, less than 10:1, less than 8:1, less than 6:1, less than 5:1, less than 4:1, less than 3:1, or less than 2:1, e.g., while being above a certain value, such as greater than 0.01:1, greater than 0.1:1, or greater than 1:1.

In one particular set of embodiments, the normalized resistance ratio between a main filter layer and a pre-filter layer adjacent (e.g., directly adjacent) the main filter layer of a filter media is between 1:1 and 8:1, between 1:1 and 5:1, or between 1:1 and 3:1. If the filter media includes another main filter layer, the resistance ratio between the downstream main filter layer to the upstream main filter layer may be between 1:1 and 10:1, between 1:1 and 8:1, between 1:1 and 6:1, between 1:1 and 4:1, or between 3:1 and 4:1. Additional layers are also possible.

In another particular set of embodiments, a filter media includes a normalized resistance ratio of a second layer to a first layer of 4:1 or greater, and a normalized resistance ratio of a third layer to a second layer of 4:1 or less. In some embodiments, a filter media includes a normalized resistance ratio of a second layer to a first layer of between 4:1 and 6:1, and a normalized resistance ratio of a third layer to a second layer of between 2:1 and 4:1. In some cases, the third layer in such embodiments includes a synthetic polymer fiber having one of the weight percentages described herein.

Filter media 10 can also have good dirt holding properties. For example, filter media 10 can have an overall dirt holding capacity (DHC) of at least about 100 g/m$^2$, at least about 120 g/m$^2$, at least about 140 g/m$^2$, at least about 150 g/m$^2$, at least about 160 g/m$^2$, at least about 180 g/m$^2$, at least about 200 g/m$^2$, at least about 220 g/m$^2$, at least about 240 g/m$^2$, at least about 260 g/m$^2$, at least about 280 g/m$^2$, or at least about 300 g/m$^2$. The dirt holding capacity, as referred to herein, is tested based on a Multipass Filter Test following the ISO 16889 procedure (modified by testing a flat sheet sample) on a Multipass Filter Test Stand manufactured by FTI. The testing uses ISO A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test was run at a face velocity of 0.14 meters/min until a terminal pressure of 172 kPa above the baseline filter pressure drop is obtained.

The dirt holding capacity of a filter media can be normalized against the basis weight of the media to produce a specific capacity (e.g., dirt holding capacity of the media divided by the basis weight of the media). The specific capacity of the filter media described herein may range, for example, between 1.5 and 3.0, between 1.7 and 2.7, or between 1.8 and 2.5. In certain embodiments, the specific capacity of a filter media is greater than or equal to 1.5, greater than or equal to 1.6, greater than or equal to 1.7, greater than or equal to 1.8, greater than or equal to 1.9, greater than or equal to 2.0, greater than or equal to 2.1, greater than or equal to 2.2, greater than or equal to 2.3, greater than or equal to 2.4, greater than or equal to 2.5, greater than or equal to 2.6, greater than or equal to 2.7, greater than or equal to 2.8, greater than or equal to 2.9, or greater than or equal to 3.0.

The dirt holding capacity of a filter media may also be normalized against the overall basis weight of the media and the log of the filtration ratio ($Beta_{(x)}$) for certain particle sizes "x" or greater to produce a unitless value, "Absolute specific capacity at x microns". For example, for a filter media that captures particle sizes of 10 microns or greater and which has a certain $Beta_{(10)}$ value, the "Absolute specific capacity at 10 microns" for that media would be calculated by multiplying the dirt holding capacity of the media by the square root of the log of the $Beta_{(x)}$ value for 10 micron and larger particles, and dividing by the overall basis weight of the media.

In certain embodiments, a filter media having two (or more) layers has an absolute specific capacity at 10 microns of greater than about 2.5, greater than about 2.65, greater than about 2.7, greater than about 2.75, greater than about 3.0, greater than about 3.4, greater than about 3.5, greater than about 3.6, greater than about 3.75, greater than about 4.0, greater than about 4.25, greater than about 4.5, greater than about 4.75, or greater than about 5.0. The filter media may additionally have a total basis weight of, for example, less than about 200 g/m², less than about 150 g/m², less than about 100 g/m², less than about 90 g/m², less than about 80 g/m², less than about 75 g/m², less than about 70 g/m², less than about 68 g/m², less than about 65 g/m², less than about 60 g/m², or less than about 50 g/m². Other values and ranges of absolute specific capacity and basis weight are also possible.

In certain embodiments, a filter media having three (or more) layers has an absolute specific capacity at 10 microns of greater than about 2.0, greater than about 2.25, greater than about 2.5, greater than about 2.6, greater than about 2.65, greater than about 2.75, greater than about 3.0, greater than about 3.5, greater than about 3.75, greater than about 4.0, greater than about 4.25, or greater than about 4.5. The filter media may additionally have a total basis weight of, for example, less than about 200 g/m², less than about 190 g/m², less than about 180 g/m², less than about 170 g/m², less than about 160 g/m², less than about 150 g/m², less than about 140 g/m², less than about 130 g/m², less than about 120 g/m², less than about 110 g/m², less than about 100 g/m², less than about 90 g/m², or less than about 80 g/m². Other values and ranges of absolute specific capacity and basis weight are also possible.

In some embodiments, a filter media described herein includes a relatively high overall dirt holding capacity, such as one of the values described above, and a relatively high overall permeability, such as one of the values described above. For instance, a filter media may have an overall dirt holding capacity of at least about 150 g/m² (e.g., at least about 180 g/m², at least about 200 g/m², at least about 230 g/m², at least about 250 g/m²), and an overall permeability of greater than about 25 cfm/sf (e.g., greater than about 30 cfm/sf, greater than about 35 cfm/sf, greater than about 40 cfm/sf, greater than about 45 cfm/sf, or greater than about 50 cfm/sf). In certain embodiments, these performance characteristics are achieved with a filter media including a third layer comprising a synthetic polymer fiber (e.g., the third layer including at least about 40 wt %, at least about 60 wt %, at least about 80 wt %, at least about 90 wt %, at least about 95 wt %, or about 100% synthetic fibers).

The filter media described herein may be used for the filtration of various particle sizes, e.g., particles having a size of less than or equal to about 20 microns, less than or equal to about 15 microns, less than or equal to about 10 microns, less than or equal to about 5 microns, less than or equal to about 3 microns, or less than or equal to about 1 micron. The efficiency of filtering such particle sizes can be measured using a Multipass Filter Test. For instance, the efficiency values were determined following the ISO 16889 procedure (modified by testing a flat sheet sample) on a Multipass Filter Test Stand manufactured by FTI. The testing uses ISO A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test was run at a face velocity of 0.14 meters/min until a terminal pressure of 172 kPa above the baseline filter pressure drop is obtained. Particle counts (particles per milliliter) at the particle sized selected (e.g., 1, 3, 4, 5, 7, 10, 15, 20, 25, or 30 microns) upstream and downstream of the media can be taken at ten points equally divided over the time of the test. The average of upstream and downstream particle counts can be taken at each selected particle size. From the average particle count upstream (injected $–C_0$) and the average particle count downstream (passed thru-C) the liquid filtration efficiency test value for each particle size selected can be determined by the relationship $[(100-[C/C_0])*100\%]$.

Efficiency can also be expressed in terms of a Beta value (or Beta ratio), where $Beta_{(x)}=y$ is the ratio of upstream count ($C_0$) to downstream count (C), and where x is the minimum particle size that will achieve the actual ratio of $C_0$ to C that is equal to y. The penetration fraction of the media is 1 divided by the $Beta_{(x)}$ value (y), and the efficiency fraction is 1—penetration fraction. Accordingly, the efficiency of the media is 100 times the efficiency fraction, and $100*(1-1/Beta_{(x)})$=efficiency percentage. For example, a filter media having a $Beta_{(x)}=200$ has an efficiency of $[1-(1/200)]*100$, or 99.5% for x micron or greater particles. The filter media described herein may have a wide range of Beta values, e.g., a $Beta_{(x)}=y$, where x can be, for example, 1, 3, 5, 7, 10, 12, 15, 20, 25, 30, 50, 70, or 100, and where y can be, for example, at least 2, at least 10, at least 75, at least 100, at least 200, or at least 1000. It should be understood that other values of x and y are also possible; for instance, in some cases, y may be greater than 1000. It should also be understood that for any value of x, y may be any number (e.g., 10.2, 12.4) representing the actual ratio of $C_0$ to C. Likewise, for any value of y, x may be any number representing the minimum particle size that will achieve the actual ratio of $C_0$ to C that is equal to y.

In certain embodiments, the third layer of a filter media described herein has a mean flow pore size value as described herein (e.g., between about 5 microns and about 50 microns, between about 10 microns and about 30 microns, between about 10 microns and about 20 microns, between 5 microns and 15 microns, between 8 microns and 12 microns, between about 1 micron and about 5 microns, between about 5 microns and about 9 microns, or between about 13 microns and about 17 microns) and an efficiency of $Beta_{(x)}$=at least 200. In some instances, the third layer has an efficiency of $Beta_{(x)}$=at least 200 and a mean flow pore size of x±2 microns. For example, if x=10 and the third layer has an efficiency of $Beta_{(10)}$=at least 200, the mean pore size of the third layer may be 10±2 microns (i.e., 8-12 microns). In other cases, the third layer has an efficiency of $Beta_{(x)}$=at least 200 and a mean flow pore size of x±1 micron.

The filter media may be produced using processes based on known techniques. In some cases, the filter media is produced using a wet laid or a dry laid process. In general, a wet laid process involves mixing together the fibers; for example, glass fibers (e.g., chopped strand and/or microglass) may be mixed together, optionally with any synthetic fibers, to provide a glass fiber slurry. In some cases, the slurry is an aqueous-based slurry. In certain embodiments, the microglass fibers, and optionally any chopped strand and/or synthetic fibers, are stored separately in various holding tanks prior to being mixed together. These fibers may be processed through a pulper before being mixed together. In some embodiments, combinations of chopped strand glass fibers, microglass fibers, and/or synthetic fibers are processed through a pulper and/or a holding tank prior to being mixed together. As discussed above, microglass fibers may include fine microglass fibers and coarse microglass fibers.

It should be appreciated that any suitable method for creating a glass fiber slurry may be used. In some cases, additional additives are added to the slurry to facilitate processing. The temperature may also be adjusted to a suitable range, for example, between 33° F. and 100° F. (e.g., between 50° F. and 85° F.). In some embodiments, the temperature of the slurry is maintained. In some cases, the temperature is not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 0.5% by weight.

In some cases, the pH of the glass fiber slurry may be adjusted as desired. For instance, the pH of the glass fiber slurry may range between about 1.5 and about 4.5, or between about 2.6 and about 3.2.

Before the slurry is sent to a headbox, the slurry may be passed through centrifugal cleaners for removing unfiberized glass or shot. The slurry may or may not be passed through additional equipment such as refiners or deflakers to further enhance the dispersion of the fibers. Fibers may then be collected on a screen or wire at an appropriate rate using any suitable machine, e.g., a fourdrinier, a rotoformer, a cylinder, or an inclined wire fourdrinier.

In some embodiments, the process involves introducing binder (and/or other components) into a pre-formed glass fiber layer. In some embodiments, as the glass fiber layer is passed along an appropriate screen or wire, different components included in the binder, which may be in the form of separate emulsions, are added to the glass fiber layer using a suitable technique. In some cases, each component of the binder resin is mixed as an emulsion prior to being combined with the other components and/or glass fiber layer. In some embodiments, the components included in the binder may be pulled through the glass fiber layer using, for example, gravity and/or vacuum. In some embodiments, one or more of the components included in the binder resin may be diluted with softened water and pumped into the glass fiber layer.

As noted above, different layers of glass fibers may be combined to produce filter media based on desired properties. For example, in some embodiments, a relatively coarser pre-filter layer may be combined with a relatively finer fiber layer (i.e., a main filter layer) to form a multi-layered filter media. Optionally, the filter media can include one or more additional finer fiber layers as described above.

Multi-phase filter media may be formed in an appropriate manner. As an example, a filter media or a portion thereof may be prepared by a wet laid process where a first glass fiber slurry (e.g., glass fibers in an aqueous solvent such as water) is applied onto a wire conveyor to form a first layer. A second glass fiber slurry (e.g., glass fibers in an aqueous solvent such as water) is then applied onto the first layer. Vacuum may be continuously applied to the first and second slurries during the above process to remove solvent from the fibers, resulting in the simultaneous formation of the first and second layers into a composite article. The composite article is then dried. Due to this fabrication process, at least a portion of the fibers in the first layer can be intertwined with at least a portion of the fibers from the second layer (e.g., at the interface between the two layers). Additional layers can also be formed and added using a similar process or a different process such as lamination, co-pleating, or collation (i.e., placed directly adjacent one another and kept together by pressure). For example, in some cases, two layers (e.g., two fine fiber layers) are formed into a composite article by a wet laid process in which separate fiber slurries are laid one on top of the other as water is drawn out of the slurry, and the composite article is then combined with a third layer (e.g., a pre-filter layer) by any suitable process (e.g., lamination, co-pleating, or collation). It can be appreciated that filter media or composite article formed by a wet laid process may be suitably tailored not only based on the components of each fiber layer, but also according to the effect of using multiple fiber layers of varying properties in appropriate combination to form filter media having the characteristics described herein.

In one set of embodiments, at least two layers of a filter media (e.g., a layer and a composite article comprising more than one layer, or two composite articles comprising more than one layer) are laminated together. For instance, a first layer (e.g., a prefilter layer including relatively coarse fibers) may be laminated with a second layer (e.g., a main filter layer including relatively fine fibers), where the first and second layers face each other to form a single, multilayer article (e.g., a composite article) that is integrally joined in a single process line assembly operation to form the filter media. If desired, the first and second layers can be combined with another main filter layer (e.g., a third layer) using any suitable process before or after the lamination step. In other embodiments, two or more layers (e.g., main filter layers) are laminated together to form a multilayer article. After lamination of two or more layers into a composite article, the composite article may be combined with additional layers via any suitable process.

In other embodiments, a dry laid process is used. In a dry laid process, glass fibers are chopped and dispersed in air that is blown onto a conveyor, and a binder is then applied. Dry laid processing is typically more suitable for the production of highly porous media including bundles of glass fibers.

For some embodiments, one or more layers (e.g., a third layer) of a filter media described herein may be produced from a meltblown process. For example, meltblown processes and manufacturing methods described in U.S. Patent Publication No. 2009/0120048, entitled "Meltblown Filter Medium," which is incorporated herein by reference in its entirety for all purposes, may be used, including the lamination techniques described therein. Electrospinning processes may also be used to form one or more layers described herein. A synthetic polymer layer may be manufactured and adhered on to a single-phase or multi-phase layer in any appropriate manner. In some embodiments, a layer including a synthetic polymer may be positioned downstream with respect to a single-phase or multi-phase layer or vice versa.

During or after formation of a layer, a composite article including two or more combined layers, or a final filter media, the layer, composite article or final filter media may be further processed according to a variety of known techniques. For example, the filter media or portions thereof may be pleated and used in a pleated filter element. For instance, two layers may be joined by a co-pleating process. In some embodiments, filter media, or various layers thereof, may be suitably pleated by forming score lines at appropriately spaced distances apart from one another, allowing the filter media to be folded. It should be appreciated that any suitable pleating technique may be used. The physical and mechanical qualities of the filter media can be tailored to provide, in some embodiments, an increased number of pleats, which may be directly proportional to increased surface area of the filter media. The increased surface area may allow the filter media to have an increased filtration efficiency of particles from fluids. For example, in some cases, the filter media described herein includes 2-12 pleats per inch, 3-8 pleats per inch, or 2-5 pleats per inch. Other values are also possible.

It should be appreciated that the filter media may include other parts in addition to the two or more layers described herein. In some embodiments, further processing includes incorporation of one or more structural features and/or stiffening elements. For instance, the media may be combined with additional structural features such as polymeric and/or metallic meshes. In one embodiment, a screen backing may be disposed on the filter media, providing for further stiffness. In some cases, a screen backing may aid in retaining the pleated configuration. For example, a screen backing may be an expanded metal wire or an extruded plastic mesh.

As previously indicated, the filter media disclosed herein can be incorporated into a variety of filter elements for use in various applications including hydraulic and non-hydraulic filtration applications. Exemplary uses of hydraulic filters (e.g., high-, medium-, and low-pressure filters) include mobile and industrial filters. Exemplary uses of non-hydraulic filters include fuel filters (e.g., automotive fuel filters), oil filters (e.g., lube oil filters or heavy duty lube oil filters), chemical processing filters, industrial processing filters, medical filters (e.g., filters for blood), air filters, and water filters. In some cases, filter media described herein can be used as coalescer filter media.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

In one set of embodiments, the filter media described herein is incorporated into a filter element having a cylindrical configuration, which may be suitable for hydraulic and other applications. The cylindrical filter element may include a steel support mesh that can provide pleat support and spacing, and which protects against media damage during handling and/or installation. The steel support mesh may be positioned as an upstream and/or downstream layer. The filter element can also include upstream and/or downstream support layers that can protect the filter media during pressure surges. These layers can be combined with filter media 10, which may include two or more layers as noted above. The filter element may also have any suitable dimensions. For example, the filter element may have a length of at least 15 inches, at least 20 inches, at least 25 inches, at least 30 inches, at least 40 inches, or at least 45 inches. The surface area of the filter media may be, for example, at least 220 square inches, at least 230 square inches, at least 250 square inches, at least 270 square inches, at least 290 square inches, at least 310 square inches, at least 330 square inches, at least 350 square inches, or at least 370 square inches.

The filter elements may have the same property values as those noted above in connection with the filter media. For example, the above-noted resistance ratios, basis weight ratios, dirt holding capacities, efficiencies, specific capacities, and fiber diameter ratios between various layers of the filter media may also be found in filter elements.

During use, the filter media mechanically trap particles on or in the layers as fluid flows through the filter media. The filter media need not be electrically charged to enhance trapping of contamination. Thus, in some embodiments, the filter media are not electrically charged. However, in some embodiments, the filter media may be electrically charged.

The following examples are intended to illustrate certain embodiments of the present invention, but are not to be construed as limiting and do not exemplify the full scope of the invention.

Example 1

This example describes the formation of several multi-layered filter media and their characterization according to various embodiments of the invention.

Two- and three-layered filter media were prepared according to the specifications listed in Table 1. The two-layered filter media (Samples 2A, 2B, and 3) included a first main filter layer (denoted top phase-main filter layer in Table 1) and a second main filter layer (bottom phase-main filter layer) adjacent the first layer.

The two-layered media was formed by a wet laid papermaking process. Briefly, for one layer, 250 gallons of water was added to a hydropulper, then sulfuric acid was added to bring the pH to approximately 3.0. Fibers were added to the mixture, and the fiber and water slurry was mixed for 4 minutes. The slurry was then pumped to a first holding chest with 900 gallons of additional water. For the second layer, this process was repeated with the fibers needed for the second layer, and the slurry was pumped to a different holding chest.

Slurry from the first holding chest was pumped to the main headbox of a fourdrinier papermachine, along with additional water and additional sulfuric acid to reduce the pH to about 2.6. The slurry was allowed to flow onto the forming wire of the papermachine and water was drained by gravity, as well as by a series of vacuum slots eventually forming a wet, loosely bound web of fibers which was carried away by the moving forming wire. To make the second layer, fiber from the second holding chest was pumped, along with dilution water, to a secondary headbox also located on the fourdrinier papermaking machine. The secondary headbox was positioned so that the forming wire carrying the drained fibers from the main headbox passed underneath the secondary headbox. The second slurry laid on top of, and then drained through, the already formed web from the primary headbox. The water was then removed by another series of vacuum slots resulting in a combined single web including fibers from the main headbox as a bottom layer and fibers from the secondary headbox as a top layer. This combined single web was then sprayed with a latex solution to add organic binder. The web was then dried by passing over a series of steam filled dryer cans. The now dry web is wound into rolls at a reel.

The three-layered filter media (Samples 1, 4A, 4B, 5A and 5B) included a pre-filter layer as a first layer (pre-filter-single phase), a main filter layer as the second layer (top phase-main filter layer) adjacent the first layer, and another main filter layer (bottom phase-main filter layer) adjacent the second layer. Prior to assembly with the first layer, the second and third layers were formed simultaneously into a composite article using the same wet laid process as for the two-layered media. The first layer was then assembled with the composite article by collation.

TABLE 1

Comparison of various two- and three-layered filter media

| | Characteristics and Parameters | Sample 1 (three layer media) | Sample 2A (two layer media) | Sample 2B (two layer media) | Sample 3 (two layer media) |
|---|---|---|---|---|---|
| Physical Attributes | Overall Caliper (inches) | 0.035 | N.A. | N.A. | N.A. |
| | Total BW (lbs/3000 ft$^2$) | 70 | 40 | 40 | 40 |
| | Total BW (g/m$^2$) | 114 | 55 | 85 | 65 |
| | Total Permeability (ft$^2$/min/ft$^2$) | 21 | ~26 | ~27 | ~15 |
| | Pre-Filter (Single Phase) | | | | |
| | BW (lb/3000 ft$^2$) | 30 | NA | NA | NA |
| | Grammage (g/m$^2$) | 49 | | | |
| | Permeability | 232 | | | |
| | Top Phase - Main Filter Layer | | | | |
| | BW (lb/3000 ft$^2$) | 20 | 20 | 20 | 20 |
| | Grammage (g/m$^2$) | 33 | 33 | 33 | 33 |
| | Permeability | 118 | 114 | 153 | 59 |
| | Bottom Phase - Main Filter Layer | | | | |
| | BW (lb/3000 ft$^2$) | 20 | 20 | 20 | 20 |
| | Grammage (g/m$^2$) | 33 | 33 | 33 | 33 |
| | Permeability | 38 | 38 | 38 | 37 |
| | Overall | | | | |
| Furnish | Glass | 93% glass | 93% glass | 93% glass | 93% glass |
| | Organic | 7% organic | 7% organic | 7% organic | 7% organic |
| | Pre-Filter (Single Phase) Composition | | | | |
| | Total Glass Content (diameter) | 92% | | NA | |
| | JM Code 108A (1.0 microns) | | | | |
| | EFC Code 309 (1.9 microns) | | | | |
| | EFC Code 310 (3.0 microns) | | | | |
| | EFC Code 312 (3.9 microns) | | | | |
| | EFC Code 316 (5.2 microns) | 92% | | | |
| | EFC Code 717 (6.1 microns) | | | | |
| | EFC Code 718 (5.8 microns) | | | | |
| | EFC Code 719 (8.5 microns) | | | | |
| | Total Organic Content | 8% | | | |
| | Polyester Fiber | | | | |
| | Liquid Binder | 5% | | | |
| | Kuralon Fiber | 3% | | | |
| | Top Phase - Main Filter Layer | | | | |
| | Total Glass Content (diameter) | 92% | 92% | 92% | 92% |
| | JM Code 108A (1.0 microns) | | | | |
| | EFC Code 309 (1.9 microns) | | | | 92% |
| | EFC Code 310 (3.0 microns) | 92% | 92% | 46% | |
| | EFC Code 312 (3.9 microns) | | | 46% | |
| | EFC Code 316 or 716 (5.2 microns) | | | | |
| | EFC Code 717 (6.1 microns) | | | | |

TABLE 1-continued

Comparison of various two- and three-layered filter media

|  |  |  |  |  |  |
|---|---|---|---|---|---|
|  | EFC Code 718 (5.8 microns) |  |  |  |  |
|  | EFC Code 719 (8.5 microns) |  |  |  |  |
|  | Total Organic Content | 8% | 8% | 8% | 8% |
|  | Polyester Fiber (0.6 Denier) |  |  |  |  |
|  | Liquid Binder | 5% | 5% | 5% | 5% |
|  | Kuralon Fiber | 3% | 3% | 3% | 3% |
|  | Bottom Phase - Main Filter Layer |  |  |  |  |
|  | Total Glass Content (diameter) | 94% | 94% | 94% | 94% |
|  | JM Code 108A (1.0 microns) | 46% | 42% | 42% | 42% |
|  | EFC Code 309 (1.9 microns) | 16% | 17% | 17% | 17% |
|  | EFC Code 310 (3.0 microns) |  |  |  |  |
|  | EFC Code 312 (3.9 microns) | 16% | 17% | 17% | 17% |
|  | EFC Code 316 or 716 (5.2 microns) |  |  |  |  |
|  | EFC Code 717 (6.1 microns) |  |  |  |  |
|  | EFC Code 718 (5.8 microns) | 16% | 17% | 17% | 17% |
|  | EFC Code 719 (8.5 microns) |  |  |  |  |
|  | Total Organic Content | 6% | 6% | 6% | 6% |
|  | Polyester Fiber (0.6 Denier) |  |  |  |  |
|  | Liquid Binder | 4% | 4% | 4% | 4% |
|  | Kuralon Fiber | 2% | 2% | 2% | 2% |
| Performance Attributes | Overall Dirt Holding Capacity (g/m$^2$) | 225.0 | 177.0 | 169.0 | 117.0 |
|  | Overall Beta$_{(x)}$ = 200 (μm$_c$) | 8.6 | 10.1 | 10.0 | 8.1 |
|  | Absolute Specific Capacity @ 10 μm$_{(c)}$ | 3.3 | 2.6 | 2.5 | 2.0 |
|  | Actual Resistance Ratio: Top Phase Main Filter/Pre-Filter | 2.0 | N.A. | N.A. | N.A. |
|  | Actual Resistance Ratio: Bottom Phase/Top Phase - Main Filter | 3.3 | 3.0 | 4.1 | 1.6 |
| Additional Performance Attributes | Overall Dirt Holding Capacity (g/m$^2$) | 225.0 | 177.0 | 169.0 | 117.0 |
|  | Specific Capacity (g dust/g media) | 1.97 | 2.72 | 2.60 | 1.80 |
|  | Overall Beta$_{(x)}$ = 200 (μm$_c$) | 8.6 | 10.1 | 10.0 | 8.1 |
|  | Normalized Resistance Ratio. Top Phase Main Filter/Pre-Filter | 2.9 | N.A. | N.A. | N.A. |
|  | Normalized Resistance Ratio: Bottom Phase/Top Phase - Main Filter | 3.3 | 3.0 | 4.1 | 1.6 |

|  | Characteristics and Parameters | Sample 4A (three layer media) | Sample 4B (three layer media) | Sample 5A (three layer media) | Sample 5B (three layer media) |
|---|---|---|---|---|---|
| Physical Attributes | Overall Caliper (inches) | N.A. | N.A. | N.A. | N.A. |
|  | Total BW (lbs/3000 ft$^2$) | 70 | 70 | 70 | 70 |
|  | Total BW (g/m$^2$) | 114 | 114 | 114 | 114 |
|  | Total Permeability (ft$^2$/min/ft$^2$) | ~20 | ~20 | ~20 | ~20 |
|  | Pre-Filter (Single Phase) |  |  |  |  |
|  | BW (lb/3000 ft$^2$) | 30 | 30 | 30 | 30 |
|  | Grammage (g/m$^2$) | 49 | 49 | 49 | 49 |
|  | Permeability | 152 | 304 | 76 | 608 |
|  | Top Phase – Main Filter Layer |  |  |  |  |
|  | BW (lb/3000 ft$^2$) | 20 | 20 | 20 | 20 |
|  | Grammage (g/m$^2$) | 33 | 33 | 33 | 33 |
|  | Permeability | 114 | 114 | 114 | 114 |
|  | Bottom Phase - Main Filter Layer |  |  |  |  |
|  | BW (lb/3000 ft$^2$) | 20 | 20 | 20 | 20 |
|  | Grammage (g/m$^2$) | 33 | 33 | 33 | 33 |
|  | Permeability | 36 | 36 | 36 | 36 |
|  | Overall |  |  |  |  |
| Furnish | Glass | 93% glass | 93% glass | 93% glass | 93% glass |
|  | Organic | 7% organic | 7% organic | 7% organic | 7% organic |
|  | Pre-Filter (Single Phase) Composition |  |  |  |  |
|  | Total Glass Content (diameter) | 92% | 92% | 92% | 92% |
|  | JM Code 108A (1.0 microns) |  |  |  |  |
|  | EFC Code 309 (1.9 microns) |  |  |  |  |
|  | EFC Code 310 (3.0 microns) |  |  | 92% |  |
|  | EFC Code 312 (3.9 microns) | 92% |  |  |  |
|  | EFC Code 316 (5.2 microns) |  |  |  |  |
|  | EFC Code 717 (6.1 microns) |  | 92% |  |  |
|  | EFC Code 718 (5.8 microns) |  |  |  |  |
|  | EFC Code 719 (8.5 microns) |  |  |  | 92% |
|  | Total Organic Content | 8% | 8% | 8% | 8% |
|  | Polyester Fiber |  |  |  |  |
|  | Liquid Binder | 5% | 5% | 5% | 5% |
|  | Kuralon Fiber | 3% | 3% | 3% | 3% |

TABLE 1-continued

Comparison of various two- and three-layered filter media

|  |  |  |  |  |  |
|---|---|---|---|---|---|
| | Top Phase - Main Filter Layer | | | | |
| | Total Glass Content (diameter) | 92% | 92% | 92% | 92% |
| | JM Code 108A (1.0 microns) | | | | |
| | EFC Code 309 (1.9 microns) | | | | |
| | EFC Code 310 (3.0 microns) | 92% | | 92% | |
| | EFC Code 312 (3.9 microns) | | | | |
| | EFC Code 316 or 716 (5.2 microns) | | | | |
| | EFC Code 717 (6.1 microns) | | 92% | | 92% |
| | EFC Code 718 (5.8 microns) | | | | |
| | EFC Code 719 (8.5 microns) | | | | |
| | Total Organic Content | 8% | 8% | 8% | 8% |
| | Polyester Fiber (0.6 Denier) | | | | |
| | Liquid Binder | 5% | 5% | 5% | 5% |
| | Kuralon Fiber | 3% | 3% | 3% | 3% |
| | Bottom Phase - Main Filter Layer | | | | |
| | Total Glass Content (diameter) | 94% | 94% | 94% | 94% |
| | JM Code 108A (1.0 microns) | 46% | 46% | 46% | 46% |
| | EFC Code 309 (1.9 microns) | 16% | 16% | 16% | 16% |
| | EFC Code 310 (3.0 microns) | | | | |
| | EFC Code 312 (3.9 microns) | 18% | 16% | 16% | 18% |
| | EFC Code 316 or 716 (5.2 microns) | | | | |
| | EFC Code 717 (6.1 microns) | | | | |
| | EFC Code 718 (5.8 microns) | 16% | 16% | 16% | 16% |
| | EFC Code 719 (8.5 microns) | | | | |
| | Total Organic Content | 6% | 6% | 6% | 6% |
| | Polyester Fiber (0.6 Denier) | | | | |
| | Liquid Binder | 4% | 4% | 4% | 4% |
| | Kuralon Fiber | 2% | 2% | 2% | 2% |
| Performance Attributes | Overall Dirt Holding Capacity (g/m$^2$) | 221.0 | 203.0 | 103.0 | 170.0 |
| | Overall Beta$_{(x)}$ = 200 (µm$_c$) | 8.8 | 8.3 | 7.1 | 7.8 |
| | Absolute Specific Capacity @ 10 µm$_{(c)}$ | 3.2 | 3.1 | 1.7 | 2.7 |
| | Actual Resistance Ratio: Top Phase Main Filter/Pre-Filter | 1.3 | 2.7 | 0.7 | 5.3 |
| | Actual Resistance Ratio: Bottom Phase/Top Phase - Main Filter | N.A. | N.A. | N.A. | N.A. |
| Additional Performance Attributes | Overall Dirt Holding Capacity (g/m$^2$) | 221.0 | 203.0 | 103.0 | 170.0 |
| | Specific Capacity (g dust/g media) | 1.94 | 1.78 | 0.90 | 1.49 |
| | Overall Beta$_{(x)}$ = 200 (µm$_c$) | 8.3 | 8.3 | 7.1 | 7.8 |
| | Normalized Resistance Ratio: Top Phase Main Filter/Pre-Filter | 2.0 | 4.0 | 1.0 | 8.0 |
| | Normalized Resistance Ratio: Bottom Phase/Top Phase - Main Filter | N.A. | N.A. | N.A. | N.A. |

Example 2

This example describes the formation of several single- and multi-layered filter media and their characterization.

Table 2 includes various comparative samples having Beta$_{(x)}$=1000, where x is about 4 to 4.5 microns. Comparative Sample 1A had a first (upstream) layer and a second (downstream) layer, the second layer having finer fibers than the first layer. The particular compositions of the first and second layers of Comparative Sample 1A are included in Table 4. The first and second layers were formed using the handsheet protocol described below. Comparative Samples 2-10 are commercial grades from Hollingsworth and Vose Company. As shown in Table 2, all of the comparative samples had absolute specific capacity at 10 µm values of less than 2.7.

TABLE 2

Characteristics for various single- and multi-layered filter media

| Sample | BW (lbs/r) | BW (g/m$^2$) | CFM | Resistance Ratio (as is) | Resistance Ratio (normalized) | Capacity | Beta = 1000 | Absolute Specific Capacity @ 10 µm$_{(c)}$ |
|---|---|---|---|---|---|---|---|---|
| Comparative Sample 1A (2 layers, handsheet) | 50.3 | 81.8 | 6.8 | 0.02 | 0.01 | 88.09 | 4.1 | 1.97 |
| Comparative Sample 2 (HC4683, Single Layer) | 47.7 | 77.6 | 7.5 | | | 87.35 | 4.3 | 2.17 |
| Comparative Sample 3 (HC4683, Single Layer) | 47.8 | 77.7 | 7.4 | | | 84.03 | 4.4 | 2.08 |
| Comparative Sample 4 (HC4683, Single Layer) | 47.9 | 77.9 | 7.6 | | | 90.64 | 4.4 | 2.24 |
| Comparative Sample 5 (HB7633, Single Layer) | 49.2 | 80.0 | 6.8 | | | 82.73 | 4 4 | 1.94 |
| Comparative Sample 6 (DC4271, 2 layers) | 58.8 | 87.5 | 7.38 | | | 114.24 | 4.5 | 2.60 |
| Comparative Sample 7 (DC4271, 2 layers) | 53.8 | 87.5 | 7.18 | | | 115.25 | 4.5 | 2.68 |
| Comparative Sample 8 (DC4271, 2 layers) | 54.1 | 38.0 | 7.21 | | | 121.67 | 4.5 | 2.58 |
| Comparative Sample 9 (DC4271, 2 layers) | 58.6 | 87.2 | 7.72 | | | 119.31 | 4.6 | 2.68 |
| Comparative Sample 10 (DC4271, 2 layers) | 54.7 | 88.9 | 7.56 | | | 116.96 | 4.6 | 2.66 |

Table 3 includes various comparative samples having $Beta_{(x)}=200$, where x is about 6 to 7 microns. Comparative Sample 1B had the same composition as that of Comparative Sample 1A, except the first and second layers were reversed. That is, Comparative Sample 1B had a first (upstream) layer and a second (downstream) layer, the first layer having finer fibers than the second layer. The first and second layers were formed using the handsheet protocol described below.

Comparative Samples 11-18 are commercial grades from Hollingsworth and Vose Company.

Samples 6-9 are two-layered filter media having various physical characteristics and performance characteristics according certain embodiments of the invention.

As shown in Table 2, all of the comparative samples had absolute specific capacity at 10 μm values of less than 3.4, while Samples 6-9 had values of greater than 3.4.

drained through the primary layer and the forming wire. The two layer handsheet was then vacuumed and dried on a photodryer.

Samples 6 and 7 were formed using the method described in Example 1.

The commercial grade comparative samples shown in Tables 2 and 3, as well as Samples 8 and 9, were formed using a paper machine process. Briefly, for one layer, about 1000 gallons of water was added to a hydropulper, then 2 quarts of sulfuric acid was added to bring the pH to approximately 3.0. Fibers were added to the mixture, along with 1000 gallons of water, and the fiber and water slurry was mixed for 5 minutes. The slurry was then pumped to a first holding chest with 4700 gallons of additional water.

TABLE 3

Characteristics for various single- and multi-layered filter media

| Sample | BW (lb/r) | BW (g/m²) | CFM | Resistance Ratio (as is) | Resistance Ratio (normalized) | Capacity | Beta = 200 | Absolute Specific Capacity @ 10 $\mu m_{(c)}$ |
|---|---|---|---|---|---|---|---|---|
| Comparative Sample 1B (2 layers, handsheet) | 48.2 | 78.4 | 0.2 | 0.02 | 0.01 | 77.45 | 6.2 | 1.56 |
| Comparative Sample 11 (KE1071, Single Layer) | 38.1 | 62.0 | 15.4 | | | 105.88 | 6.3 | 3.29 |
| Comparative Sample 12 (KE1071, Single Layer) | 38.6 | 62.8 | 16 | | | 104.01 | 6.3 | 3.18 |
| Comparative Sample 13 (KE1071, Single Layer) | 38.2 | 62.1 | 15.7 | | | 100.95 | 6.4 | 3.01 |
| Comparative Sample 14 (KE1071, Single Layer) | 38.3 | 62.3 | 23.4 | | | 97.39 | 6.4 | 2.96 |
| Comparative Sample 15 (KE1071, Single Layer) | 38.3 | 62.6 | 15.5 | | | 105.09 | 6.4 | 3.32 |
| Comparative Sample 16 (KE1071, Single Layer) | 38.5 | 62.3 | 21.2 | | | 99.95 | 6.4 | 3.16 |
| Comparative Sample 17 (KE1071, Single Layer) | 38.1 | 62.0 | 21.3 | | | 99.27 | 6.5 | 3.15 |
| Comparative Sample 18 (KE1071, Single Layer) | 38.4 | 62.4 | 15.6 | | | 100.44 | 6.5 | 3.07 |
| Sample 6 (2 layers, Pilot Trial) | 39.7 | 64.6 | 22.5 | | | 148.47 | 7.8 | 4.14 |
| Sample 7 (2 layers, Pilot Trial) | 40.9 | 66.5 | 21 | | | 140.39 | 7.7 | 3.84 |
| Sample 8 (2 layers, Paper Machine) | 41.4 | 67.3 | 17.7 | | | 125.29 | 7.1 | 3.58 |
| Sample 9 (2 layers, Paper Machine) | 41.5 | 67.5 | 17.8 | | | 125.28 | 7.2 | 3.49 |

The samples labeled "handsheet" in Tables 2 and 3 were formed by a wet-laid handsheet making process. The handsheet mold was prepared using standard procedures. To form a first layer, 5 mL of 25% sulfuric acid was used to acidify the entire volume of the handsheet mold to a pH of 3.0. From this prepared handsheet mold, 750 mL of acidified water was obtained and placed in a Waring 1-speed glass blender. A Variac setting of 60 was used for the pulping level. 4.53 grams of Code 112 fibers and 0.5 grams chopped strand fibers were added to the blender and pulped until well dispersed (~60 seconds). The fiber and water slurry are then added to the top of the handsheet mold, the slurry agitated and then drained through the forming wire. The wet sheet is then vacuumed and dried on a photodryer.

The second layer required a modification to the handsheet method described above in that the previously formed first layer was used as a bottom layer sheet, and was placed on the handsheet mold and supported on the edges with blotter paper. The handsheet mold was clamped down and water was carefully added on the side of the mold so as not to disturb the now wet sheet. The water was again acidified with 5 mL of 25% sulfuric acid and 750 mL withdrawn for the secondary layer mixture. The previously weighed 2.42 grams of Code 104 fiber was blended in a Waring 1-speed glass blender for ~60 seconds and then added to the top of the handsheet mold. The slurry was then carefully agitated so as not to disturb the wet bottom layer and the slurry then For two-layer media, this process was repeated with the fibers needed for the second layer, except 5000 gallons of water was added instead of 4700 gallons before being pumped to a different holding chest.

Slurry from the first holding chest was pumped to the main headbox of a fourdrinier papermachine, along with additional water and additional sulfuric acid to reduce the pH to about 2.6. The slurry was allowed to flow onto the forming wire of the papermachine and water was drained by gravity, as well as by a series of vacuum slots eventually forming a wet, loosely bound web of fibers which was carried away by the moving forming wire. To make the second layer, fiber from the second holding chest was pumped, along with dilution water, to a secondary headbox also located on the fourdrinier papermaking machine. The secondary headbox was positioned so that the forming wire carrying the drained fibers from the main headbox passed underneath the secondary headbox. The second slurry laid on top of, and then drained through, the already formed web from the primary headbox. The water was then removed by another series of vacuum slots resulting in a combined single web including fibers from the main headbox as a bottom layer and fibers from the secondary headbox as a top layer. The combined web was then dried by passing over a series of steam filled dryer cans. The now dry web is wound into rolls at a reel.

TABLE 4

Composition of Comparative Samples 1A and 1B

| Sample | Bottom Layer Furnish | Grams | BW (lbs/r) | BW (g/m²) | Top Layer Furnish | Grams | BW (lbs/r) | BW (g/m²) |
|---|---|---|---|---|---|---|---|---|
| Comparative Samples 1A and 1B | JM Code 112 (90%) JM Chop Pak A20 1/2" (10%) | 4.53 0.50 | 33.2 | 54.0 | JM Code 104 | 2.42 | 16.0 | 26.0 |

Example 3

This example describes the characterization of several single- and multi-layered filter media.

Figure 2:
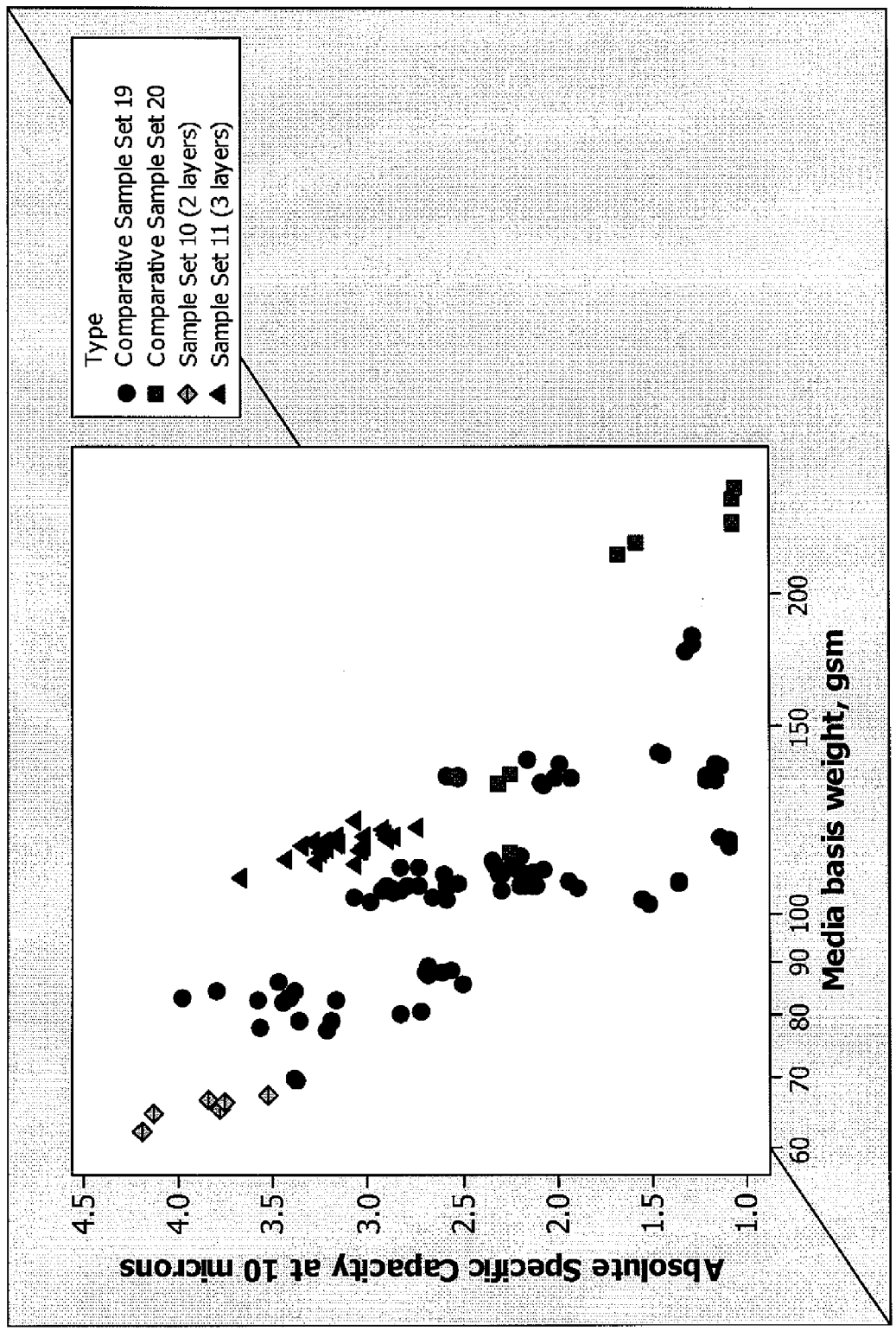
FIG. 2 shows a plot of absolute specific capacity at 10 microns versus basis weight of the filter media for various samples, according to one set of embodiments.

FIG. 2 shows the absolute specific capacity at 10 μm for various filter media plotted against the overall basis weight of the media. The basis weights were plotted on a log scale.

Comparative Sample Sets 19 and 20 are two- and three-layered media, respectively.

Sample Set 10 are two-layered media formed by the wet laid process described in Example 1. Sample Set 11 are three-layered media including a pre-filter layer, a first main filter layer, and a second main filter layer. The first and second main filter layers were fabricated using the wet laid process described in Example 1 to form a composite article, which was then collated to a pre-filter layer.

As shown in FIG. 2, Sample Set 10 (two-layered media) had higher absolute specific capacity at 10 μm values and lower basis weights than those of Comparative Sample Set 19 (two-layered media). For instance, the filter media of Sample Set 10 had absolute specific capacity at 10 μm values of greater than 3.4 while having a basis weight of less than 75 g/m². By contrast, the filter media of Comparative Sample Set 19 had absolute specific capacity at 10 μm values of less than 3.4 while having a basis weight of greater than 75 g/m².

Additionally, Sample Set 11 (three-layered media) had higher absolute specific capacity at 10 μm values and lower basis weights than the filter media of Comparative Sample Set 20 (three-layered media). For instance, the filter media of Sample Set 11 had absolute specific capacity at 10 μm values of greater than 2.65. By contrast, the filter media of Comparative Sample Set 20 had absolute specific capacity at 10 μm values of less than 2.65. The basis weights of the Sample Set 11 media was lower than those of the media of Comparative Sample Set 20.

Example 4

FIGS. 3A and 3B are tables showing characteristics of filter media having a first upstream layer including glass fibers, a second layer including glass fibers, and a third downstream layer including meltblown fibers. The first and second layers were formed using a similar process to the one described in Example 1. The third layer was formed using a meltblown process as described herein. As shown in FIGS. 3A and 3B, relatively high overall dirt holding capacities were achieved while maintaining relatively high overall permeability in certain samples.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising:
    a first layer comprising fibers, wherein the fibers in the first layer comprise synthetic polymer fibers, and wherein the fibers in the first layer have a first average diameter;
    a second layer adjacent to the first layer, the second layer comprising fibers, wherein the fibers in the second layer comprise synthetic polymer fibers, wherein the fibers in the second layer have a second average diameter, and wherein the first average diameter is greater than the second average diameter; and
    a third layer adjacent to the second layer, the third layer comprising fibers, wherein the fibers in the third layer comprise synthetic polymer fibers, wherein the fibers in the third layer have a third average diameter, wherein the second average diameter is greater than the third average diameter, wherein the third layer has a thickness of less than about 500 microns, wherein the third layer has a mean flow pore size of between about 5 microns and about 50 microns, and wherein the third layer has an air permeability of between about 50 cfm/sf and about 250 cfm/sf as measured by TAPPI Method T251;
    wherein the filter media has a thickness of between about 5 mils and about 300 mils, an overall basis weight of between about 20 and 200 gsm as measured by TAPPI Standard T410, and an overall air permeability of between about 7 cfm/sf and about 200 cfm/sf as measured by TAPPI Method T251,
    wherein the filter media has an efficiency of at least 99.5% for 25 micron or larger particles as measured by a Multipass Filter Test, and
    wherein the Multipass Filter Test is a measurement performed in accordance with a procedure described in ISO 16889 using a hydraulic test fluid, a dust level of 10 mg/liter, and a face velocity of 0.14 meters/min, and performed until a terminal pressure of 172 kPa above a baseline filter pressure drop is obtained,
    wherein at least one layer comprises at least about 97 wt. % synthetic fibers.

2. The filter media of claim 1, wherein the first layer has an air permeability of from about 4 cfm/sf to about 400 cfm/sf as measured by TAPPI Method T251.

3. The filter media of claim 1, wherein the first layer has a basis weight of between about 10 gsm and about 100 gsm as measured by TAPPI Standard T410.

4. The filter media of claim 1, wherein the first layer has a thickness of between about 3 mils and about 40 mils.

5. The filter media of claim 1, wherein the first average diameter is between about 1.0 micron and about 10.0 microns.

6. The filter media of claim 1, wherein the second layer has an air permeability of from about 15 cfm/sf to about 150 cfm/sf as measured by TAPPI Method T251.

7. The filter media of claim 1, wherein the second layer has a basis weight of between about 10 gsm and about 100 gsm as measured by TAPPI Standard T410.

8. The filter media of claim 1, wherein the second layer has a thickness of between about 3 mils and about 40 mils.

9. The filter media of claim 1, wherein the second average diameter is between about 1.0 micron and about 9.0 microns.

10. The filter media of claim 1, wherein a normalized resistance ratio of the second layer to the first layer is between 1:1 and 6:1, and wherein the normalized resistance ratio is a ratio of a resistance of the second layer as measured by TAPPI Method T251, divided by a basis weight of the second layer as measured by TAPPI Standard T410, to a resistance of the first layer as measured by TAPPI Method T251, divided by a basis weight of the first layer as measured by TAPPI Standard T410.

11. The filter media of claim 1, wherein a ratio of basis weights as measured by TAPPI Standard T410 between the second layer and the first layer is less than 2:1.

12. The filter media of claim 1, wherein the third layer has a basis weight of at least about 1 gsm and less than about 75 gsm as measured by TAPPI Standard T410.

13. The filter media of claim 1, wherein the thickness of the third layer is at least about 30 microns and less than about 500 microns.

14. The filter media of claim 1, wherein the third average diameter is between about 0.8 microns and about 5.0 microns.

15. The filter media of claim 1, wherein the mean flow pore size of the third layer is between about 13 microns and about 50 microns.

16. The filter media of claim 1, wherein a normalized resistance ratio of the third layer to the first layer is between 1:1 and 8:1, and wherein the normalized resistance ratio is a ratio of a resistance of the second layer as measured by TAPPI Method T251, divided by a basis weight of the second layer as measured by TAPPI Standard T410, to a resistance of the first layer as measured by TAPPI Method T251, divided by a basis weight of the first layer as measured by TAPPI Standard T410.

17. The filter media of claim 1, wherein a ratio of basis weights as measured by TAPPI Standard T410 between the first layer and the third layer, or between the second layer and the third layer, is greater than 1:1.

18. The filter media of claim 1, wherein the third layer comprises polyester or polyamide fibers.

19. The filter media of claim 1, wherein the fibers in the third layer have an average length of at least about 1 inch.

20. The filter media of claim 1, comprising a fourth layer, wherein the fourth layer has an average fiber diameter smaller than the third average diameter, and wherein the fourth layer is adjacent one or more of the first layer, the second layer, and the third layer.

21. The filter media of claim 20, wherein the fourth layer has a basis weight of less than about 50 gsm as measured by TAPPI Standard T410.

22. The filter media of claim 20, wherein the fourth layer has a thickness of at least about 30 microns and less than about 500 microns.

23. The filter media of claim 20, wherein the fourth layer has an air permeability of from about 15 cfm/sf to about 150 cfm/sf as measured by TAPPI Method T251.

24. The filter media of claim 1, wherein the first layer has an air permeability of from about 4 cfm/sf to about 400 cfm/sf as measured by TAPPI Method T251 and a basis weight of between about 10 gsm and about 100 gsm as measured by TAPPI Standard T410, wherein the first average diameter is between about 1.0 micron and about 10.0 microns, wherein the second layer has an air permeability of from about 15 cfm/sf to about 150 cfm/sf as measured by TAPPI Method T251 and a basis weight of between about 10 gsm and about 100 gsm as measured by TAPPI Standard T410, and wherein the second average diameter is between about 1.0 micron and about 9.0 microns.

25. The filter media of claim 24, wherein the third layer has a basis weight of at least about 1 gsm and less than about 75 gsm as measured by TAPPI Standard T410, wherein the mean flow pore size of the third layer is between about 13 microns and about 50 microns, and wherein the third average diameter is between about 0.8 microns and about 5.0 microns.

26. The filter media of claim 25, comprising a fourth layer, wherein the fourth layer has an air permeability of from about 15 cfm/sf to about 150 cfm/sf as measured by TAPPI Method T251, a basis weight of less than about 50 gsm as measured by TAPPI Standard T410, wherein the fourth layer has an average fiber diameter smaller than the third average diameter, and wherein the fourth layer is adjacent one or more of the first layer, the second layer, and the third layer.

27. The filter media of claim 1, wherein the synthetic polymer fibers of the third layer comprise meltblown, meltspun, melt electrospun, and/or solvent electrospun fibers.

28. The filter media of claim 1, wherein the filter media has a dirt holding capacity of at least about 100 g/m$^2$ as measured by the Multipass Filter Test.

* * * * *